United States Patent
Kanai et al.

(10) Patent No.: US 7,054,912 B2
(45) Date of Patent: *May 30, 2006

(54) DATA TRANSFER SCHEME USING CACHING TECHNIQUE FOR REDUCING NETWORK LOAD

(75) Inventors: Tatsunori Kanai, Kanagawa (JP); Toshibumi Seki, Kanagawa (JP); Kenichiro Yoshii, Tokyo (JP); Hideaki Sato, Kanagawa (JP); Takayuki Miyazawa, Kanagawa (JP); Haruhiko Toyama, Kanagawa (JP); Yasuhiro Kimura, Kanagawa (JP); Hideki Yoshida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 745 days.

This patent is subject to a terminal disclaimer.

(21) Appl. No.: 10/092,540

(22) Filed: Mar. 8, 2002

(65) Prior Publication Data

US 2002/0129167 A1 Sep. 12, 2002

(30) Foreign Application Priority Data

Mar. 12, 2001 (JP) .......................... P 2001-069284
Mar. 12, 2001 (JP) .......................... P 2001-069285

(51) Int. Cl.
*G06F 15/167* (2006.01)
(52) U.S. Cl. .................................................... 709/213
(58) Field of Classification Search ................. 709/247, 709/235, 229, 232, 212–219; 711/130
See application file for complete search history.

(56) References Cited

U.S. PATENT DOCUMENTS

| | | | | |
|---|---|---|---|---|
| 5,961,602 A | * | 10/1999 | Thompson et al. | 709/229 |
| 6,112,231 A | * | 8/2000 | DeSimone et al. | 709/213 |
| 6,178,461 B1 | * | 1/2001 | Chan et al. | 709/247 |
| 6,185,608 B1 | * | 2/2001 | Hon et al. | 709/216 |
| 6,330,606 B1 | * | 12/2001 | Logue et al. | 709/226 |
| 6,363,413 B1 | * | 3/2002 | Kidder | 709/203 |
| 6,405,252 B1 | * | 6/2002 | Gupta et al. | 709/224 |
| 6,510,469 B1 | * | 1/2003 | Starnes et al. | 709/247 |
| 6,546,005 B1 | * | 4/2003 | Berkley et al. | 370/353 |
| 6,546,473 B1 | * | 4/2003 | Cherkasova et al. | 711/158 |

OTHER PUBLICATIONS

Barron C. Housel, et al., "WebExpress: a System for Optimizing Web Browsing in a Wireless Environment", MOBICON 1996, pp. 108-116.

Vegard Holmedahl, et al., "Cooperative Caching of Dynamic Content on a Distributed Web Server", Proc. 7th HPDC, 1998, pp. 1-8.

* cited by examiner

*Primary Examiner*—Krisna Lim
(74) *Attorney, Agent, or Firm*—Oblon, Spivak, McClelland, Maier & Neustadt, P.C.

(57) ABSTRACT

In a data transfer scheme using a caching technique and/or a compression technique which is capable of reducing the network load of a network connecting between data transfer devices, correspondences between data and their names are registered at the data transfer devices and the corresponding names are transferred, instead of transferring the data, for those data for which the correspondences are registered, so that it is possible to reduce the amount of transfer data among the data transfer devices.

44 Claims, 37 Drawing Sheets

FIG.5
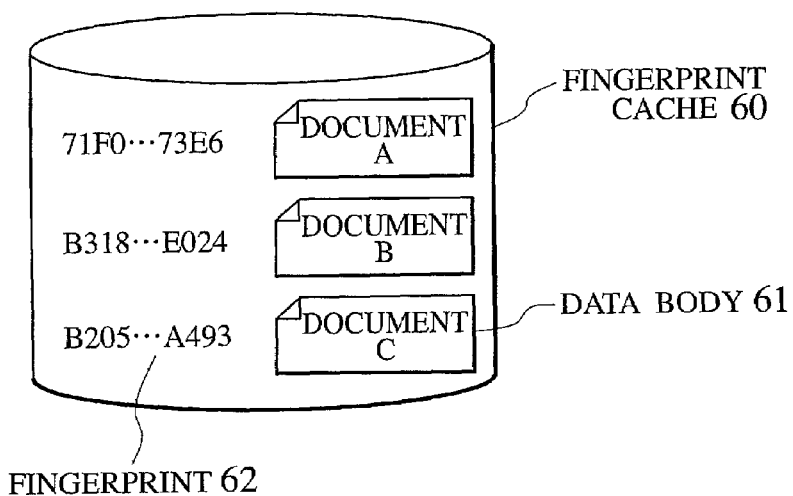
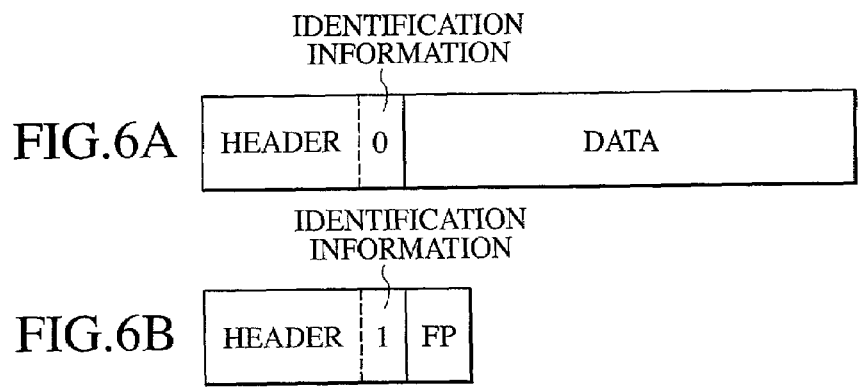
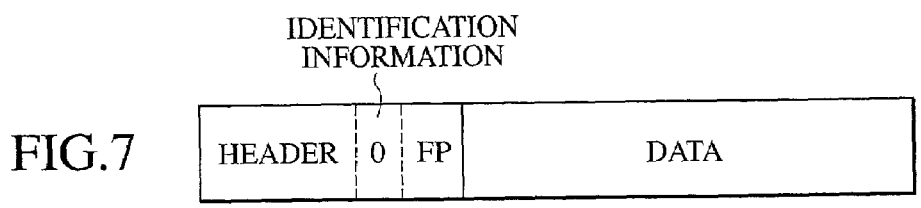

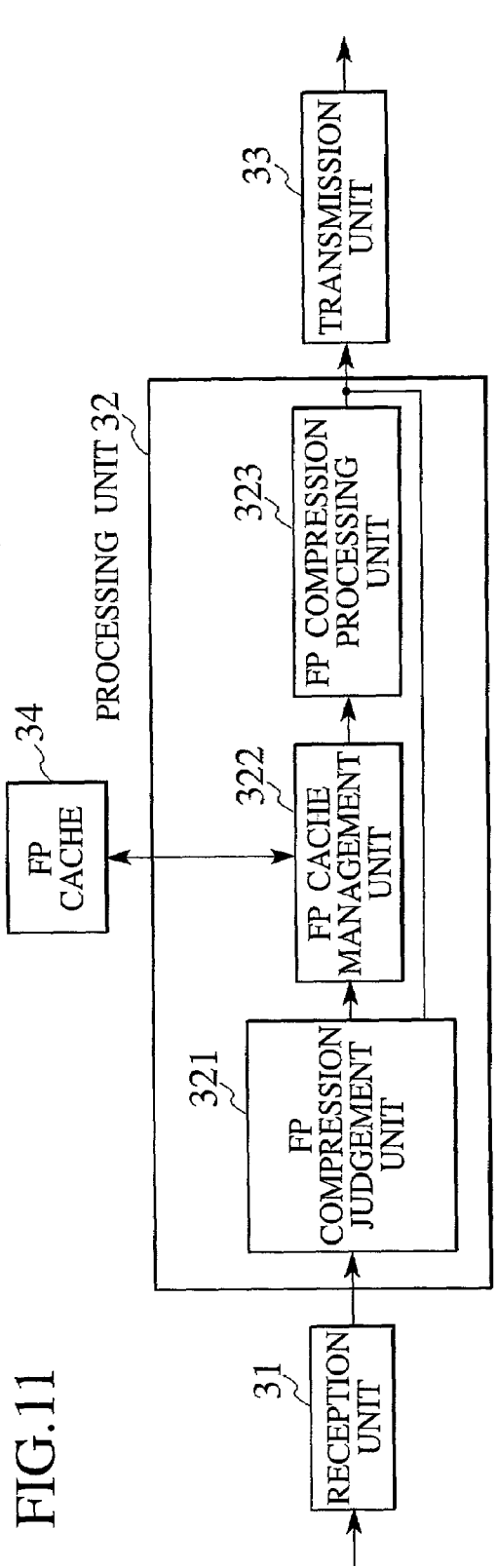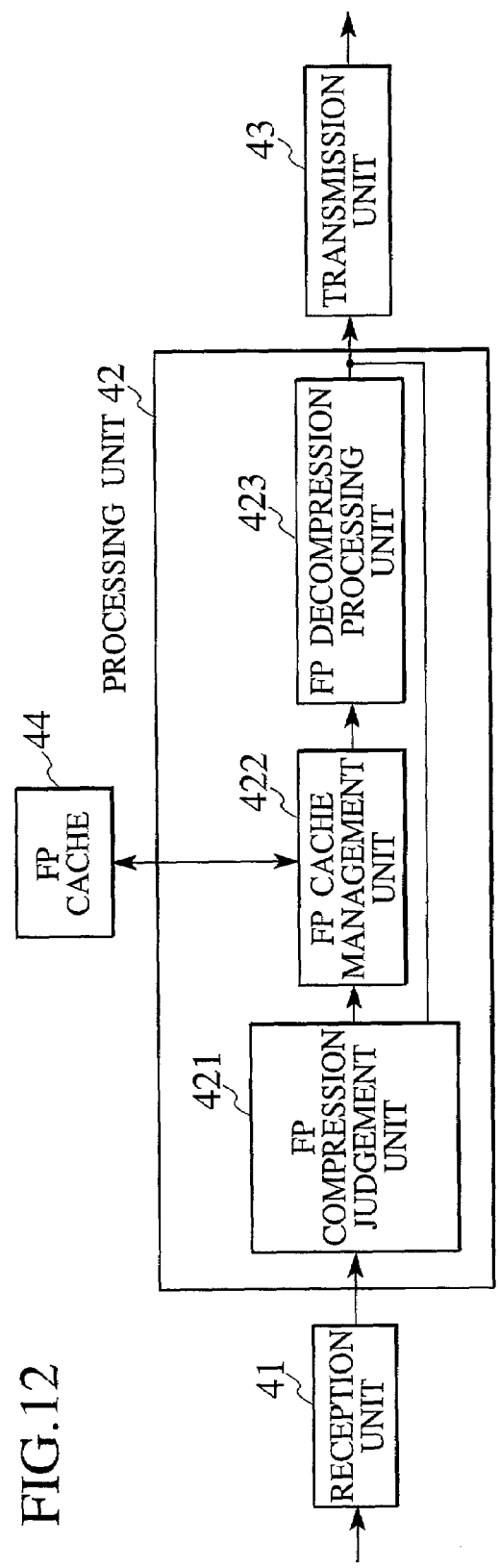

FIG.32

```
         ┌  HTTP/1.1 200 OK
         │  Date: Tue, 26 Nov 1996 15:42:51 GMT
         │  Content-Type: text/html
HEADER  ─┤  Last-Modified: Wed, 30 Oct 1996 13:15:30 GMT
         │  Fingerprint-Mode: 0 ─── IDENTIFICATION INFORMATION
         └  Content-Length: 548

┌  <!DOCTYPE HTML PUBLIC "-//W3C//DTD HTML 4.01 Transitional//EN"
         │     "http://www.w3.org/TR/html4/loose.dtd">
         │  <HTML>
         │  <HEAD><TITLE>My Homepage</TITLE></HEAD>
BODY    ─┤  <BODY>
(DATA)   │  <H1>Welcome!</H1>
         │    ...
         │  </BODY>
         └  </HTML>
```

FIG.33

```
         ┌  HTTP/1.1 200 OK
         │  Date: Tue, 26 Nov 1996 15:42:51 GMT
         │  Content-Type: text/html
HEADER  ─┤  Last-Modified: Wed, 30 Oct 1996 13:15:30 GMT
         │  Fingerprint-Mode: 1 ─── IDENTIFICATION INFORMATION
         └  Content-Length: 32

BODY    ┌  6E39B97293A0DE54E2048B0C84E30128 ─── FP
(DATA)  └
```

FIG.34

```
HTTP/1.1 200 OK
Date: Tue, 26 Nov 1996 15:42:51 GMT
Content-Type: text/html
Last-Modified: Wed, 30 Oct 1996 13:15:30 GMT
Fingerprint-Mode: 0
Fingerprint: 6E39B97293A0DE54E2048B0C84E30128 ——— IDENTIFICATION INFORMATION — FP
Content-Length: 548
```
— HEADER

```
<!DOCTYPE HTML PUBLIC "-//W3C//DTD HTML 4.01 Transitional//EN"
"http://www.w3.org/TR/html4/loose.dtd">
<HTML>
<HEAD><TITLE>My Homepage</TITLE></HEAD>
<BODY>
<H1>Welcome!</H1>
   ...
</BODY>
</HTML>
```
— BODY (DATA)

FIG.35

```
         ⎧  HTTP/1.1 200 OK
         ⎪  Date: Tue, 26 Nov 1996 15:42:51 GMT
         ⎪  Content-Type: text/html
HEADER  ⎨  Last-Modified: Wed, 30 Oct 1996 13:15:30 GMT         IDENTIFICATION
         ⎪  Fingerprint-Mode: 0                                  INFORMATION
         ⎪  Fingerprint: 6E39B97293A0DE54E2048B0C84E30128 ─────── FP
         ⎩  Content-Length: 548

⎧  <!DOCTYPE HTML PUBLIC "-//W3C//DTD HTML 4.01 Transitional//EN"
         ⎪    "http://www.w3.org/TR/html4/loose.dtd">
         ⎪  <HTML>
         ⎪  <HEAD><TITLE>My Homepage</TITLE></HEAD>
BODY    ⎨  <BODY>
(DATA)   ⎪  <H1>Welcome!</H1>
         ⎪    ·
         ⎪    ·
         ⎪  </BODY>
         ⎩  </HTML>
```

FIG.36

```
         ⎧  HTTP/1.1 200 OK
         ⎪  Date: Tue, 26 Nov 1996 15:42:51 GMT
         ⎪  Content-Type: text/html
HEADER  ⎨  Last-Modified: Wed, 30 Oct 1996 13:15:30 GMT         IDENTIFICATION
         ⎪  Fingerprint-Mode: 1                                  INFORMATION
         ⎪  Fingerprint: 6E39B97293A0DE54E2048B0C84E30128 ─────── FP
         ⎩  Content-Length: 0
```

FIG.37

HEADER:
```
HTTP/1.1 200 OK
Date: Tue, 26 Nov 1996 15:42:51 GMT
Content-Type: text/html
Last-Modified: Wed, 30 Oct 1996 13:15:30 GMT
Fingerprint: 6E39B97293A0DE54E2048B0C84E30128 ———FP
Content-Length: 548
```

BODY (DATA):
```
<!DOCTYPE HTML PUBLIC "-/W3C//DTD HTML 4.01 Transitional//EN"
"http://www.w3.org/TR/html4/loose.dtd">
<HTML>
<HEAD><TITLE>My Homepage</TITLE></HEAD>
<BODY>
<H1>Welcome!</H1>
  ...
</BODY>
</HTML>
```

FIG.38

HEADER:
```
HTTP/1.1 200 OK
Date: Tue, 26 Nov 1996 15:42:51 GMT
Content-Type: text/html
Last-Modified: Wed, 30 Oct 1996 13:15:30 GMT
Fingerprint: 6E39B97293A0DE54E2048B0C84E30128 ———FP
Content-Length: 0
```

FIG.39

HEADER:
```
HTTP/1.1 200 OK
Date: Tue, 26 Nov 1996 15:42:51 GMT
Content-Type: text/html
Last-Modified: Wed, 30 Oct 1996 13:15:30 GMT
Content-Length: 548
```

BODY (DATA):
```
<!DOCTYPE HTML PUBLIC "-//W3C//DTD HTML 4.01 Transitional//EN"
 "http://wwww.w3.org/TR/html4/loose.dtd">
<HTML>
<HEAD><TITLE>My Homepage</TITLE></HEAD>
<BODY>
<H1>Welcome!</H1>
  :
</BODY>
</HTML>
```

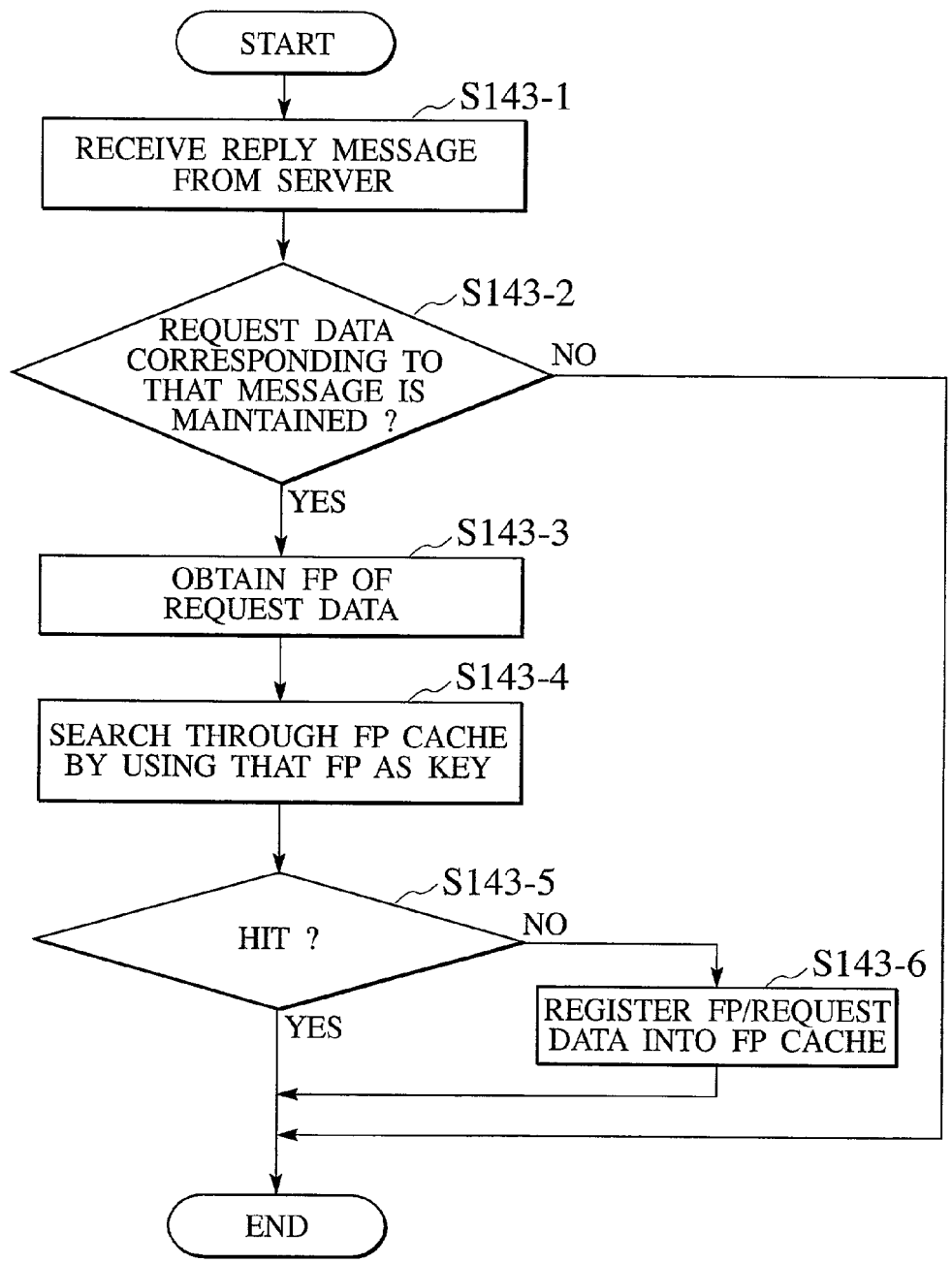

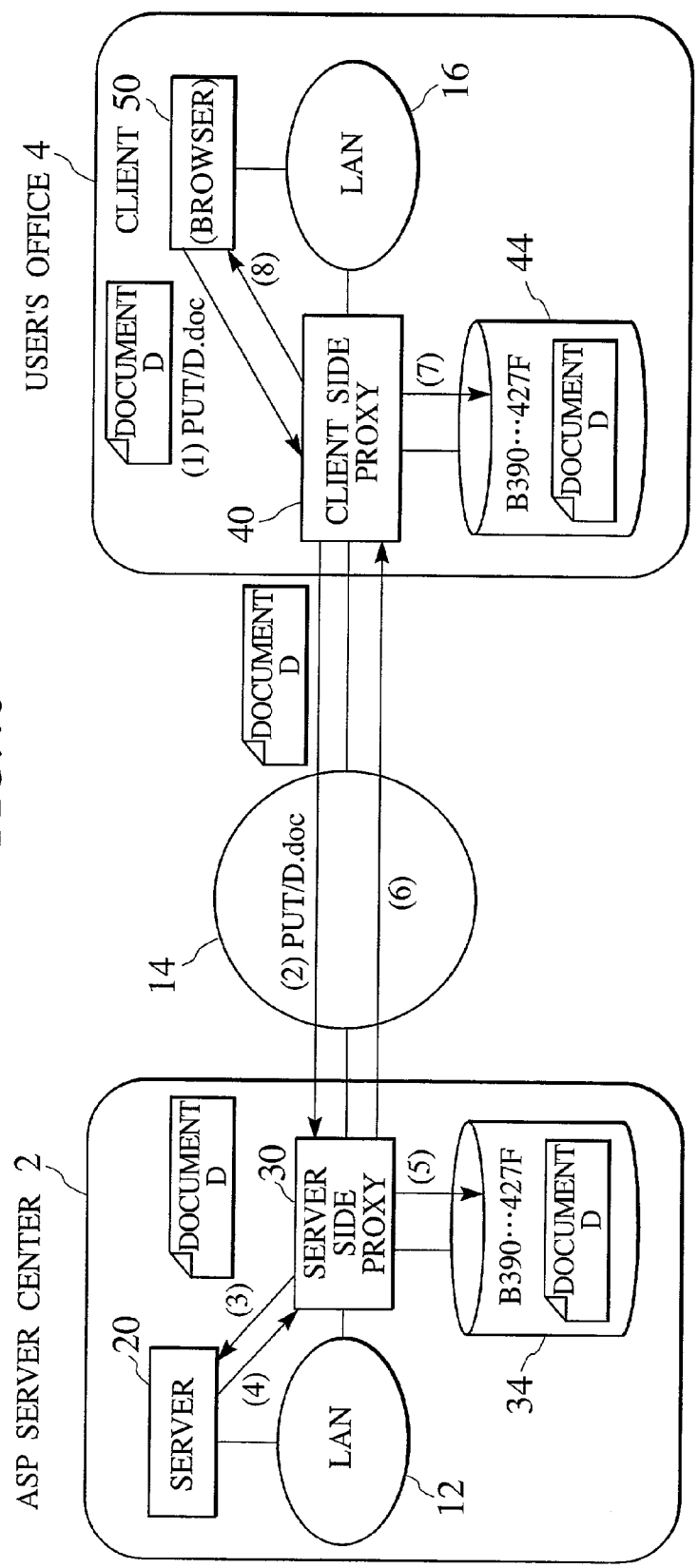

DATA TRANSFER SCHEME USING CACHING TECHNIQUE FOR REDUCING NETWORK LOAD

BACKGROUND OF THE INVENTION

1. Field of the Invention

The present invention relates to a data transfer scheme for carrying out data transfer at a data transfer device on behalf of another device.

2. Description of the Related Art

The client-server type information system formed by servers for providing various services through a network and clients for requesting desired services to the servers has been widely used. In particular, the World Wide Web system (which is also simply called Web) formed by Web servers and clients that communicate with each other by using the HTTP protocol on the Internet is the very widely used client-server type information system. Usually, a server program is operating on a server and a prescribed tool (program) such as a browser is operating on a client. The contents of the services provided on the Internet are also wide ranging so that there are various existing services including services for providing, delivering or transferring information such as that of text, still image, video and audio (home pages, e-mails, and digital contents, for example) or programs, electronic shop services for selling goods, reservation services for seats, rooms, etc., agency services for various contracts, etc., and services in new styles are appearing steadily.

Now, in the client-server type information system such as the Web, the service is provided basically by carrying out data transfer between the client and the server, regardless of the style of the service to be provided. Consequently, a capacity (bandwidth) of the network to be used for communications between the client and the server tends to be a bottleneck of the entire system. For this reason, usually, the caching technique has been used in order to reduce the network load.

In the case of the Web system, the browser or the like that is operating on the client often uses a cache mechanism for caching recently accessed data. In the Web, accesses are made by specifying information or services by using names called URLs, so that among data that are returned in response to information or services requested to the Web servers in the past, those data that are cachable are recorded in the cache on the client in correspondence with their URLs. In this case, when an information or service with the same URL as that recorded in the cache is requested, if it is possible to judge that the response data recorded in the cache has not become obsolete, it is possible to eliminate a communication between the client and the Web server by returning that response data recorded in the cache.

When a plurality of users are existing on a LAN inside offices of an enterprise, a LAN of a research organization or a LAN inside a home, it is also popular to provide a proxy server between that LAN and the Internet and provide the cache mechanism in the proxy server. The cache inside the client (the cache of the browser, for example) will be operated as a dedicated cache of that client or user, but the cache of the proxy server on the LAN will be operated as a cache shared by users of the plurality of clients or users. For this reason, the cache of the proxy server works even in the case of making an access to the URL accessed by the other (another client) in the past.

Now, in the Web, communications between the client and the server are carried out by the protocol called HTTP. The HTTP protocol uses a set of a "request message" to be sent from the client to the server and a "reply message" to be returned from the server to the client in response to that request.

The request message is formed by a "request header" and a "request body". The request header contains various information necessary for the access such as a URL for specifying an information or service to be accessed and a method name indicating the type of access. The request body contains data to be sent to the server. Such data contained in the request body are also referred to as "request data".

The reply message is formed by a "reply header" and a "reply body". The reply header contains information such as a processing result status, and the reply body contains the requested information or data of the processing result of the requested service. Such data contained in the reply body are also referred to as "reply data".

The major methods for the request message that are used for accesses of information or services include a "GET method" that reads out an information on the server, a "PUT method" that writes data of the user into the server, and a "POST method" that receives a processing result in response to the request. Besides them, methods such as a "DELETE method" are also defined.

In many cases, the request body of the request message in the GET method and the reply body of the reply message in the PUT method are empty. The request body of the request message in the POST message contains information to be used for the processing on the server side according to the need, and the reply body of the reply message in the POST method contains data obtained as a result of that processing.

The data to be read out from the server by the GET method can be classified into "dynamic data" that are to be generated at the server side at a time of each reading and "static data" that are to be returned as they are already stored at the server side. Among them, the dynamic data can possibly have different contents at different occasions of reading even for the same URL, so that in many cases, the server returns the reply message with the reply header that contains an indication that it is not cachable. Consequently, what are to be the caching targets among the Web data are the static data.

These static data can be classified into "shared data" that can be accessed by unspecified many users and "private data" for which the access control for allowing accesses only to the specific user is to be carried out by utilizing the user authentication. The former shared data are cachable for any caches. However, the latter private data are not cachable for a shared cache such as that of the proxy server (because there is a need for the server to return the private data after carrying out the user authentication). The private data are cachable in the case of a personal dedicated cache such as that of the browser.

In the POST method, the result of processing at the server side is to be returned so that the server returns the result by the reply message with the reply header that contains an indication that it is not cachable in general. For this reason, the reply data of the POST method are usually not the caching target.

In the PUT method, data are to be sent to the server so that there is no processing that involves the cache.

In the conventional Web cache, the caching targets are the static contents. Many information or services disclosed on the Web were used to be those disclosed to unspecified many users for which the information updating does not occur very frequently, so that the rate of the static contents were very high and therefore even the conventional caching technique was effective in reducing the network load.

However, in conjunction with the spread of a system in which the user makes accesses to the information or services on the server via the network by using the Web browser such as that of Web based ASP (Application Service Provider), the amount of data that cannot be handled by the conventional caching technique is increasing. For example:

- there are many private data for which the accessible users are limited by carrying out the user authentication;
- there are many dynamic data to be generated by referring to the back-end database;
- there are many cases of using the POST method such as those of the accounting slip processing and the searching; and
- there are many cases of using the PUT method for the purpose of sharing information within a group.

As a consequence, the use of the caching technique alone has been becoming rather ineffective as a method for reducing the network load.

BRIEF SUMMARY OF THE INVENTION

It is therefore an object of the present invention to provide a data transfer scheme using a caching technique and/or a compression technique which is capable of reducing the network load of a network connecting between data transfer devices.

According to one aspect of the present invention there is provided a data transfer device for receiving first data transmitted from a first communication device, transmitting the first data to another data transfer device connected to a second communication device that is a destination of the first data, receiving second data transmitted from the second communication device from the another data transfer device, and transmitting the second data to the first communication device that is a destination of the second data, the data transfer device comprising: a reception unit configured to receive the first data from the first communication device; a cache unit configured to register cache data that were transmitted to the another data transfer device in past, in correspondence to cache data names each of which is generated according to a content of each cache data and assigned to each cache data; a processing unit configured to carry out a processing for transmitting a first data name that is generated according to a content of the first data and assigned to the first data, instead of transmitting the first data, when the first data name is registered in the cache unit, or a processing for registering the first data in correspondence to the first data name into the cache unit and transmitting the first data when the first data name is not registered in the cache unit, upon receiving the first data transmitted from the first communication device; and a transmission unit configured to transmit the first data name or the first data to the another data transfer device according to a processing carried out by the processing unit.

According to another aspect of the present invention there is provided a data transfer device for receiving first data transmitted from a first communication device through another data transfer device, transmitting the first data to a second communication device that is a destination of the first data, receiving second data transmitted from the second communication device, and transmitting the second data to the another data transfer device connected to the first communication device that is a destination of the second data, the data transfer device comprising: a reception unit configured to receive the first data or a first data name that is generated according to a content of the first data and assigned to the first data, from the another data transfer device; a cache unit configured to register cache data that were received from the another data transfer device in past, in correspondence to cache data names each of which is generated according to a content of each cache data and assigned to each cache data; a processing unit configured to carry out a processing for acquiring a cache data registered in correspondence to the first data name from the cache unit and transmitting an acquired cache data when the first data name is received from the another data transfer device, or a processing for registering the first data in correspondence to the first data name to be assigned to the first data into the cache unit and transmitting the first data when the first data is received from the another data transfer device; and a transmission unit configured to transmit the acquired cache data or the first data to the second communication device according to a processing carried out by the processing unit.

According to another aspect of the present invention there is provided a data transfer method at a data transfer device for receiving first data transmitted from a first communication device, transmitting the first data to another data transfer device connected to a second communication device that is a destination of the first data, receiving second data transmitted from the second communication device from the another data transfer device, and transmitting the second data to the first communication device that is a destination of the second data, the data transfer method comprising: receiving the first data from the first communication device; judging whether a first data name that is generated according to a content of the first data and assigned to the first data is registered in a cache unit configured to register cache data that were transmitted to the another data transfer device in past in correspondence to cache data names each of which is generated according to a content of each cache data and assigned to each cache data; and carrying out a processing for transmitting the first data name, instead of transmitting the first data, when the first data name is registered in the cache unit, or a processing for registering the first data in correspondence to the first data name into the cache unit and transmitting the first data when the first data name is not registered in the cache unit.

According to another aspect of the present invention there is provided a data transfer method at a data transfer device for receiving first data transmitted from a first communication device through another data transfer device, transmitting the first data to a second communication device that is a destination of the first data, receiving second data transmitted from the second communication device, and transmitting the second data to the another data transfer device connected to the first communication device that is a destination of the second data, the data transfer method comprising: receiving the first data or a first data name that is generated according to a content of the first data and assigned to the first data, from the another data transfer device; and carrying out a processing for acquiring a cache data registered in correspondence to the first data name from a cache unit configured to register cache data that were received from the another data transfer device in past in correspondence to cache data names each of which is generated according to a content of each cache data and assigned to each cache data, and transmitting an acquired cache data when the first data name is received from the another data transfer device, or a processing for registering the first data in correspondence to the first data name to be assigned to the first data into the cache unit and transmitting the first data when the first data is received from the another data transfer device.

According to another aspect of the present invention there is provided a computer program product for causing a computer to function as a data transfer device for receiving first data transmitted from a first communication device, transmitting the first data to another data transfer device connected to a second communication device that is a destination of the first data, receiving second data transmitted from the second communication device from the another data transfer device, and transmitting the second data to the first communication device that is a destination of the second data, the computer program product comprising: a first computer program code for causing the computer to receive the first data from the first communication device; a second computer program code for causing the computer to judge whether a first data name that is generated according to a content of the first data and assigned to the first data is registered in a cache unit configured to register cache data that were transmitted to the another data transfer device in past in correspondence to cache data names each of which is generated according to a content of each cache data and assigned to each cache data; and a third computer program code for causing the computer to carry out a processing for transmitting the first data name, instead of transmitting the first data, when the first data name is registered in the cache unit, or a processing for registering the first data in correspondence to the first data name into the cache unit and transmitting the first data when the first data name is not registered in the cache unit.

According to another aspect of the present invention there is provided a computer program product for causing a computer to function as a data transfer device for receiving first data transmitted from a first communication device through another data transfer device, transmitting the first data to a second communication device that is a destination of the first data, receiving second data transmitted from the second communication device, and transmitting the second data to the another data transfer device connected to the first communication device that is a destination of the second data, the computer program product comprising: a first computer program code for causing the computer to receive the first data or a first data name that is generated according to a content of the first data and assigned to the first data, from the another data transfer device; and a second computer program code for causing the computer to carry out a processing for acquiring a cache data registered in correspondence to the first data name from a cache unit configured to register cache data that were received from the another data transfer device in past in correspondence to cache data names each of which is generated according to a content of each cache data and assigned to each cache data, and transmitting an acquired cache data when the first data name is received from the another data transfer device, or a processing for registering the first data in correspondence to the first data name to be assigned to the first data into the cache unit and transmitting the first data when the first data is received from the another data transfer device.

Other features and advantages of the present invention will become apparent from the following description taken in conjunction with the accompanying drawings.

BRIEF DESCRIPTION OF THE DRAWINGS

FIG. 5 is a diagram for explaining a fingerprint cache to be used in one embodiment of the present invention.

FIGS. 6A and 6B are diagrams showing exemplary message formats that can be used in one embodiment of the present invention.

FIG. 7 is a diagram showing another exemplary message format that can be used in one embodiment of the present invention.

FIG. 11 is a block diagram showing one exemplary configuration of a server side proxy according to one embodiment of the present invention.

FIG. 12 is a block diagram showing one exemplary configuration of a client side proxy according to one embodiment of the present invention.

FIG. 32 a diagram showing a concrete example of a message in a message format shown in FIG. 6A.

FIG. 33 a diagram showing a concrete example of a message in a message format shown in FIG. 6B.

FIG. 34 a diagram showing a concrete example of a message in a message format shown in FIG. 7.

FIG. 35 a diagram showing a concrete example of a message in a message format shown in FIG. 8A.

FIG. 36 a diagram showing a concrete example of a message in a message format shown in FIG. 8B.

FIG. 37 a diagram showing a concrete example of a message in a message format shown in FIG. 9A.

FIG. 38 a diagram showing a concrete example of a message in a message format shown in FIG. 9B.

FIG. 39 a diagram showing a concrete example of a message in a message format shown in FIG. 10.

FIG. 45 is a flow chart showing another exemplary processing procedure of the server side proxy of FIG. 11 according to one embodiment of the present invention.

FIG. 46 is a diagram for explaining another exemplary data transfer between the server side proxy of FIG. 11 and the client side proxy of FIG. 12 according to one embodiment of the present invention.

DETAILED DESCRIPTION OF THE INVENTION

Referring now to FIG. 1 to FIG. 46, one embodiment of the data transfer scheme according to the present invention will be described in detail.

In the following, an exemplary case in which a WAN is the Internet, clients are connected to a user's office LAN, and the HTTP protocol is used will be described, but the present invention is also applicable to the cases where the WAN is other than the Internet, the cases where the clients are located at LAN other than the user's office LAN such as a LAN inside a home, and the cases where the protocol other than the HTTP protocol is to be used.

Figure 31:
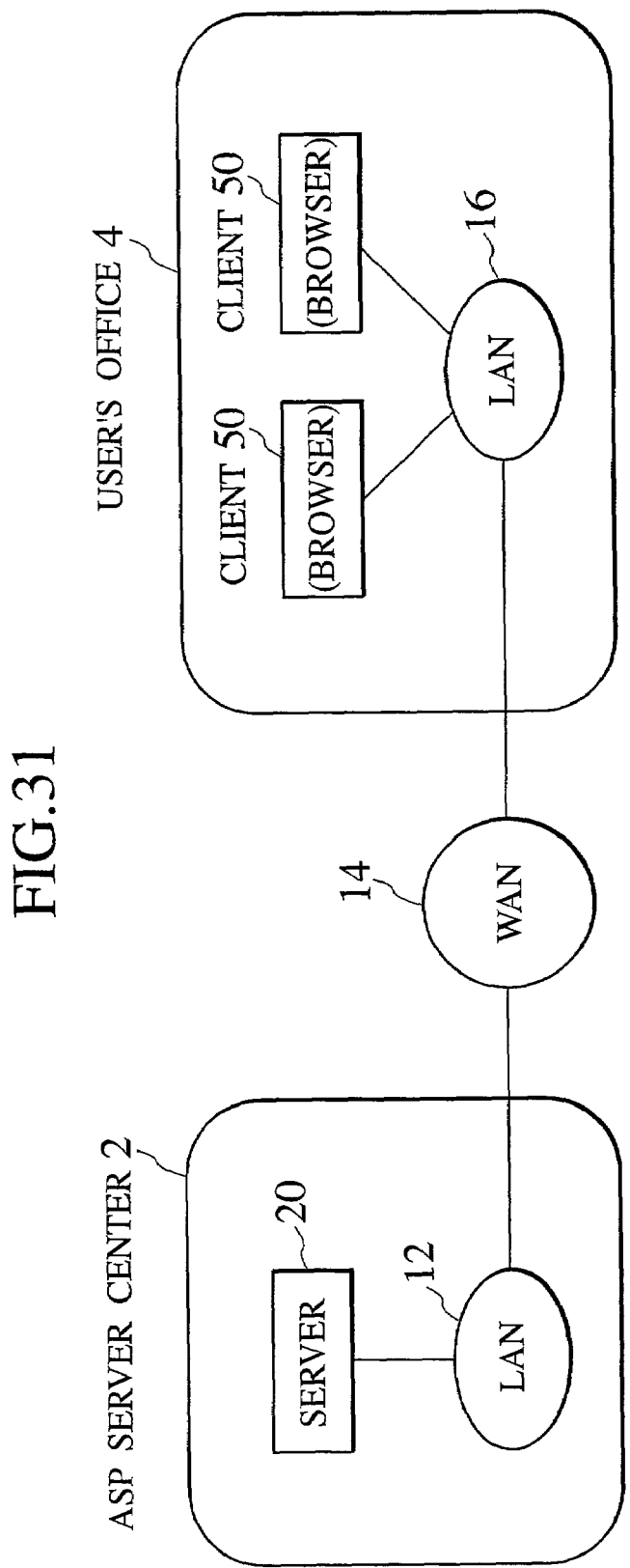
FIG. 31 is a diagram showing an exemplary configuration of a conventional computer network system to which the present invention is to be applied.

FIG. 31 shows an exemplary basic configuration of a computer network system to which the present invention is applied. In this exemplary configuration, a local area network (LAN) 12 inside an ASP server center 2 and a local area network (LAN) 16 inside a user's office 4 are connected through a wide area network (WAN) 14 such as the Internet or dedicated line, such that a server 20 inside the ASP server center 2 and a client 50 inside the user's office 4 are capable of carrying out communications through the LAN 12, the WAN 14 and the LAN 16. One or a plurality of servers 20 are connected to the LAN 12 inside the ASP server center 2 and one or a plurality of clients 50 are connected to the LAN 16 inside the user's office 4.

The Web based ASP provides services using various application programs from the server 20 provided at the ASP server center 2 through the WAN 14, and a user can access these services by using a Web browser or the like on the client 50 provided at the user's office 4.

In such a configuration, the effective communication capacity (bandwidth) of the network connecting between the LAN 16 inside the user's office 4 and the LAN 12 inside the ASP server center 2, especially that of the WAN 14 such as the Internet, is lower than those of the LAN 12 inside the ASP server center 12 and the LAN 16 inside the user's office 4, so that it can become a bottleneck of the performance that can cause the communication delay and give rise to the problem of the lower response performance of the applications.

Figure 1:
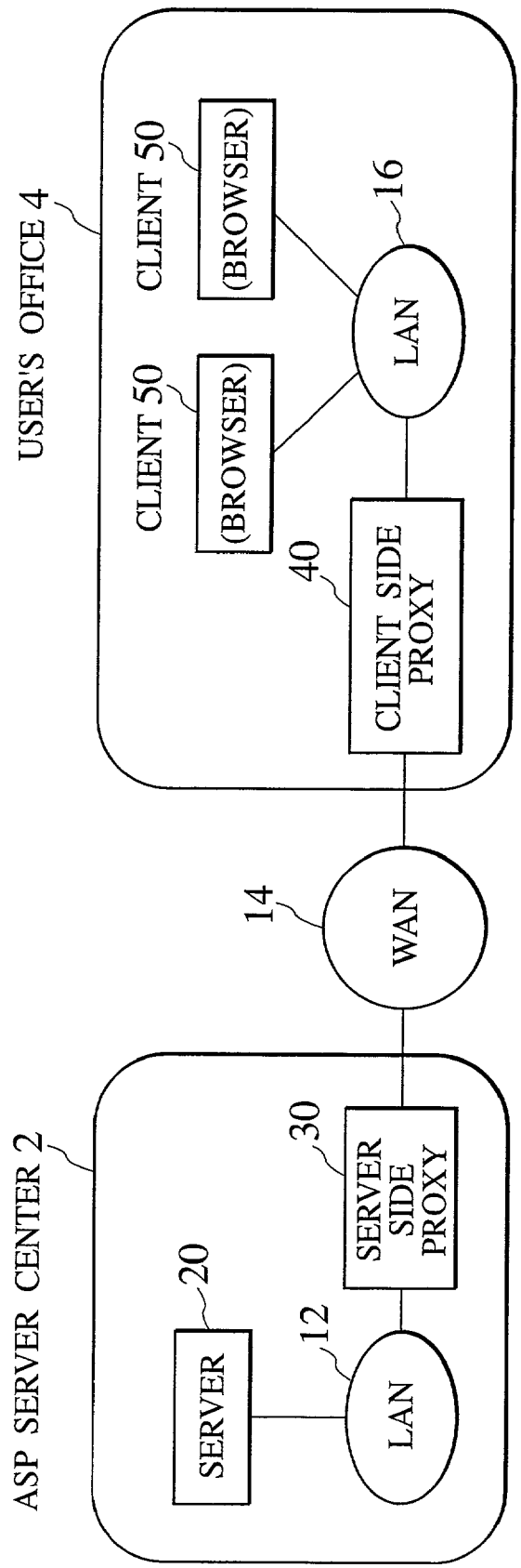
FIG. 1 is a diagram showing one exemplary configuration of a computer network system according to one embodiment of the present invention.

For this reason, in this embodiment, as shown in FIG. 1, two modules called a server side proxy 30 and a client side proxy 40 are provided at two ends of the WAN 14 that are connecting between the LAN 12 inside the ASP server center 2 and the LAN 16 inside the user's office 4 and a fingerprint compression (FP compression) to be described below is carried out between them, such that the amount of communication data is reduced and the bottleneck of the wide area network is resolved.

Each one of the server 20, the server side proxy 30, the client proxy 40 and the client 50 can be realized in a form of operating a software (a server program, a server side proxy program, a client side proxy program, or a client program, respectively) on a computer. In this case, the computer will be provided with or connected with softwares such as OS, driver software, packet communication software and encryption software which have desired functions, and hardwares such as communication interface device, external memory device and input/output device. Also, in this case, it is preferable to use the graphical user interface (GUI) for the purpose of entering information from the user or a manager and presenting information to the user.

On the client 50 used by the user in order to utilize the service, a Web browser program or the like is operated according to the purpose. The user utilizes the service by sending a request message to a server that provides the desired service such as the information transfer or the order taking through the Internet from the Web browser and receiving a reply message, or repeating this procedure according to the need, for example. Of course, it is also possible to use a software other than the general purpose software like the Web browser, such as a dedicated software for the purpose of utilizing specific service. Also, the client can be a portable telephone terminal or the like that has the Internet function, for example, rather than the general purpose computer.

On the server 20, a prescribed server program is operated, to provide the service specific to that server site with respect to the user of the client 50.

Figure 2:
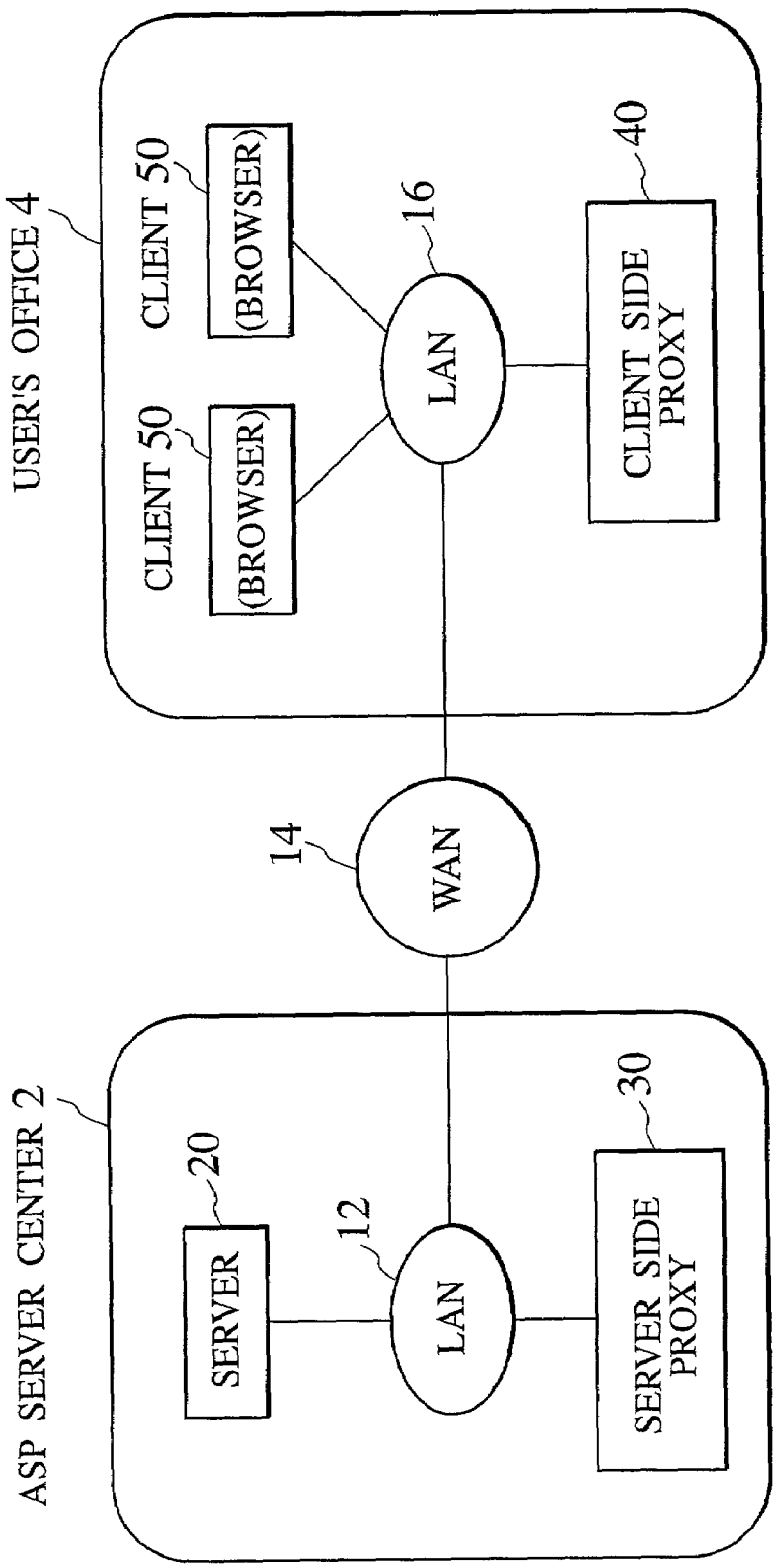
FIG. 2 is a diagram showing another exemplary configuration of a computer network system according to one embodiment of the present invention.

The server side proxy 30 can be provided to operate as a transparent proxy by being connected with both the LAN 12 inside the ASP server center 12 and the WAN 14 as shown in FIG. 1. The server side proxy 30 can also be provided on the LAN 12 inside the ASP server center 12 as shown in FIG. 2. The server side proxy 30 can also be realized as a built-in function of the server 20 as shown in FIG. 3.

Similarly, the client side proxy 40 can be provided to operate as a transparent proxy by being connected with both the LAN 16 inside the user's office 4 and the WAN 14 as shown in FIG. 1. The client side proxy 40 can also be provided on the LAN 16 inside the user's office 16 as shown in FIG. 2. The client side proxy 40 can also be realized as a built-in function of the browser or the like that operates on the client 50 as shown in FIG. 3. The client side proxy 40 can also be realized as a personal client side proxy that is operated on the client 50 on which the browser or the like is operated.

Figure 3:
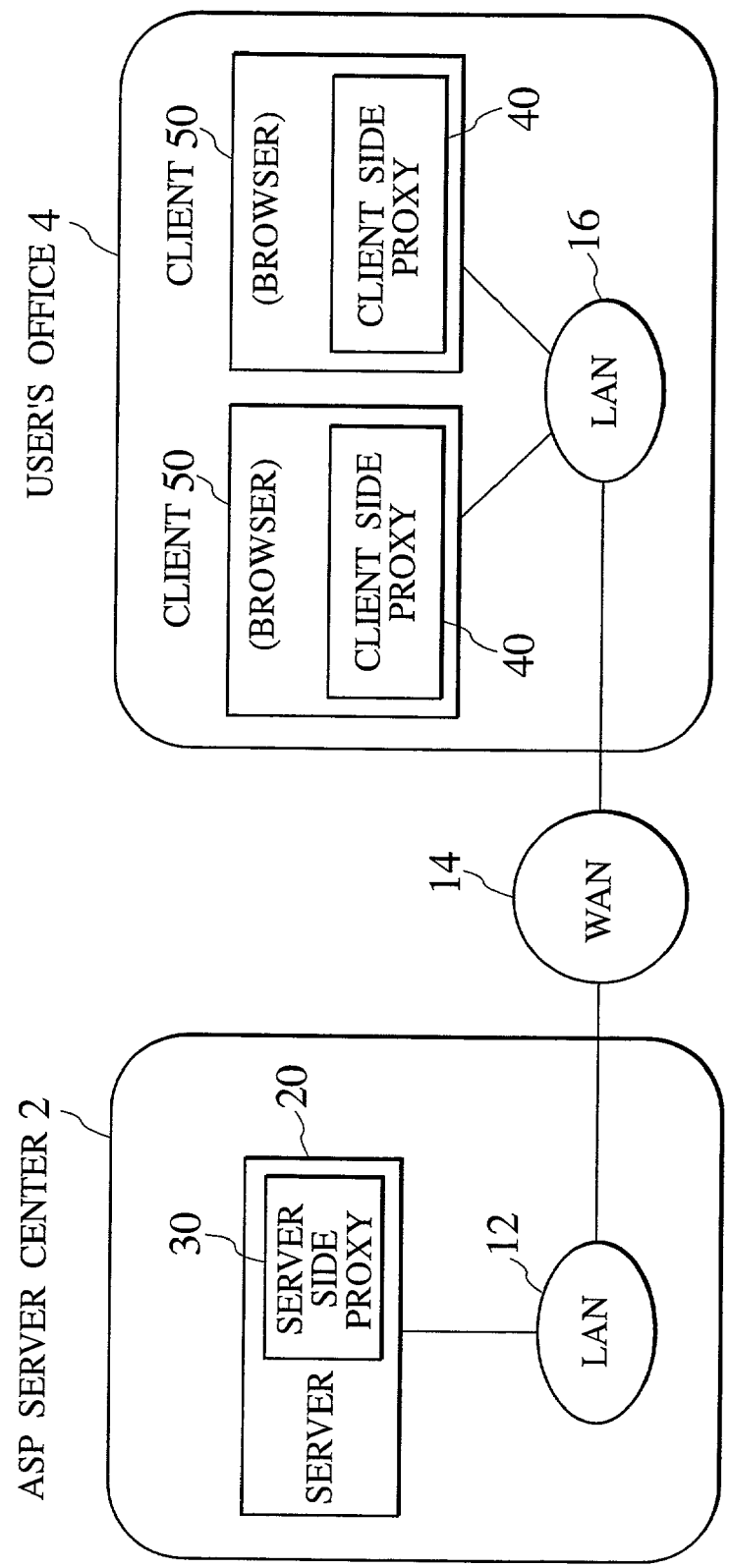
FIG. 3 is a diagram showing another exemplary configuration of a computer network system according to one embodiment of the present invention.

Note that the server side proxy 30 and the client side proxy 40 can be provided in the same form as shown in FIGS. 1 to 3, or in different forms.

Each one of the server side proxy 30 and the client side proxy 40 of this embodiment has a caching mechanism called fingerprint cache (FP cache). The fingerprint cache records and manages data to be exchanged by the HTTP protocol, by using a name called fingerprint (FP).

Figure 4:
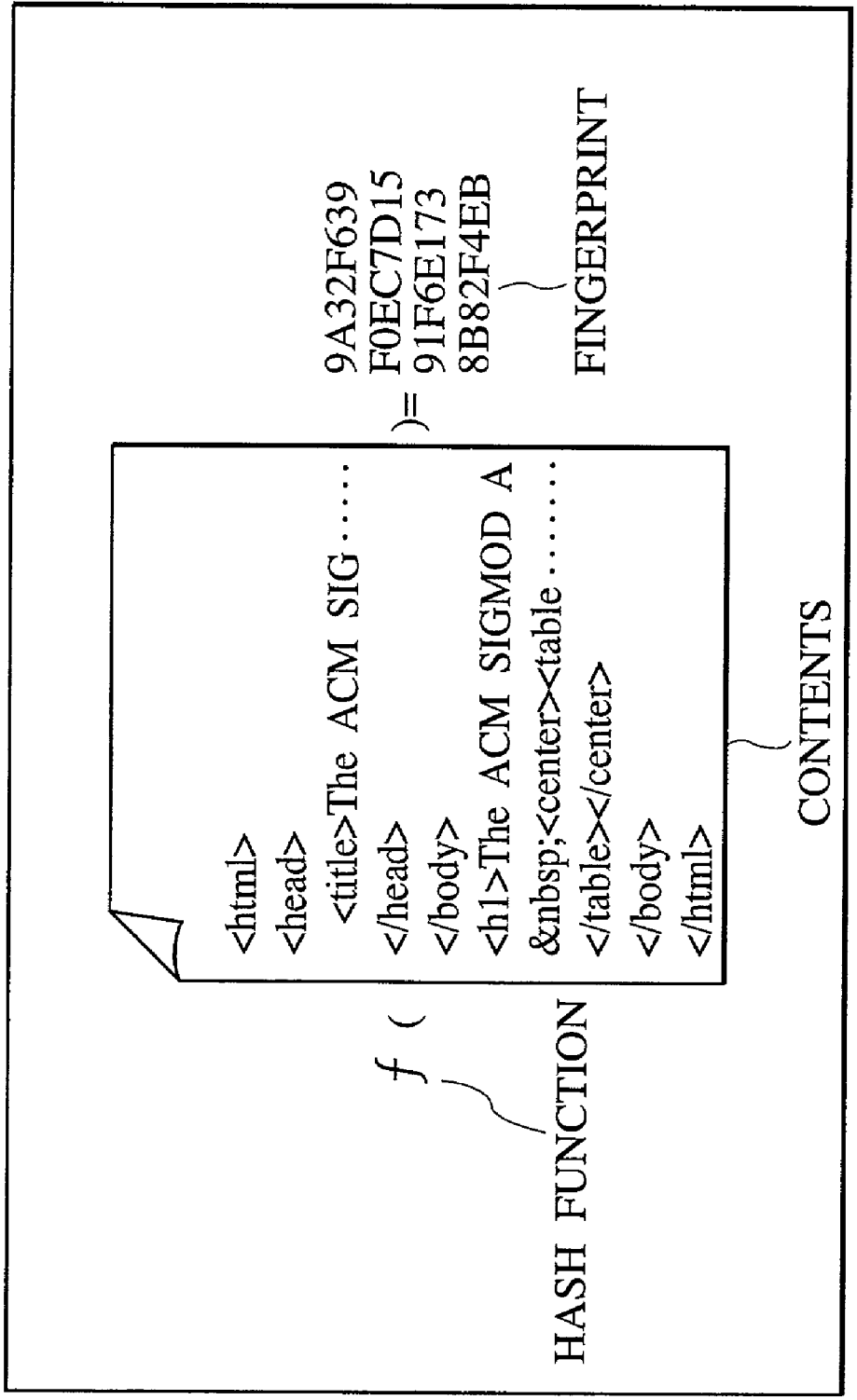
FIG. 4 is a diagram for explaining a fingerprint to be used in one embodiment of the present invention.

As shown in FIG. 4, the fingerprint is a short numerical value that is determined by using a prescribed calculation method (a hash function in the example of FIG. 4) from the content of the data (contents in the example of FIG. 4) to be exchanged by the HTTP protocol. This numerical value may have a variable length, but the numerical value with a fixed length is easier to handle from a viewpoint of the ease of the processing.

As a method for calculating the fingerprint, it is possible to use the well known hash function such as MD-5, SHA-1, etc. These hash functions are already in use for the electronic signature with respect to data, and they can convert arbitrary data given to them into a numerical value of 128 bits in the case of MD-5 or a numerical value of 160 bits in the case of SHA-1. The characteristic of these hash function is that, when two data X1 and X2 are given and the data X1 and the data X2 are identical, the hash value calculated with respect to the data X1 and the hash value calculated with respect to the data X2 will be the same, but when two different data A and B are given, the hash value calculated with respect to the data A and the hash value calculated with respect to the data B will be different at a very high probability (there is a possibility for the hash values calculated with respect to two different data A and B to be the same in principle, but that possibility is negligibly small in practice).

As shown in FIG. 5, the fingerprint cache 60 to be provided in the server side proxy 30 and the client side proxy 40 is recording and managing the data body 61 that were exchanged by using the HTTP protocol in the past, by using the fingerprint value 62 calculated from that data body 61 as its name.

For example, when the data (such as reply data) are to be transferred from the server side proxy 30 to the client side proxy 40 by using the HTTP protocol, the server side proxy 30 calculates the fingerprint of that data, and if the data corresponding to that fingerprint exists in the fingerprint cache, it implies that (data with the same content as) this data had been transferred in the past, so that the server side proxy 30 transfers the corresponding fingerprint value without transferring that data itself. The client side proxy 40 that received the fingerprint can reproduce the data to be transferred by taking out the data corresponding to that fingerprint value from the fingerprint cache. In this scheme (i.e., the sequence of data compression→data transfer→data decompression), it is possible to reduce the amount of data to be transferred through the network considerably because it suffices to send the fingerprint values for those data that are the same as the data already sent in the past. Of course, the same is also true in the case of transferring the data from the client side proxy 40 to the server side proxy 30.

Note that here it is assumed that the fingerprint cache is to be utilized at a time of transferring the data from the server side proxy 30 to the client side proxy 40, and the timing for registering a set of the data and its corresponding fingerprint into the fingerprint cache is assumed to be that at which this data is transferred from the server side proxy 30 to the client side proxy 40 for the first time (including the timing at which this data is transferred for the first time after this data was registered into the fingerprint cache once and then deleted or invalidated later on, in the case of using a configuration in which the data that is once registered into the fingerprint cache can be deleted or invalidated later on). Consequently, the data to be transmitted from the server to the client will be registered into the fingerprint cache when this data is transferred for the first time from the server side proxy 30 to the client side proxy 40, and when the data of the same content is to be transferred subsequently, the amount of transfer data will be reduced by utilizing the fingerprint cache.

Note however that there are cases where the data is to be first created at the user's office or the like and registered into the server, and then this data is to be frequently accessed from the browser or the like, as in the case of the Web-based ASP, for example. In such cases, it is also possible to register the data into the fingerprint caches of the server side proxy 30 and the client side proxy 40 at a timing of registering this data at the server such that the subsequent accesses can be made faster.

For this reason, when the reply data to be transmitted by the server is the data originally transferred from the client to the server (originally transferred as the request data), the registration timing is set to be the timing at which the original request data that becomes the reply data is transferred from the client side proxy 40 to the server side proxy 30 for the first time. In this case, when that request data becomes the reply data and is to be transferred from the server side proxy 30 to the client side proxy 40 for the first time, the registration into the fingerprint cache has already been completed, so that the amount of transfer data can be reduced by utilizing the fingerprint cache even when it is transferred as the reply data for the first time.

For the convenience of the explanation, the compression of the amount of transfer data by replacing the data body of a message with the fingerprint by utilizing the fingerprint cache at a time of the data transfer between the server side proxy 30 and the client side proxy 40 will be referred to as a fingerprint compression (FP compression) hereafter.

Note that every message can be a target for applying the FP compression (i.e., a target for which the processing to replace the data with the fingerprint is to be carried out) between the server side proxy 30 and the client side proxy 40, but it is also possible to set those messages that satisfy a prescribed condition as not targets for applying the FP compression (which are always to be transferred without the FP compression), in order to omit the application of the FP compression with respect to those messages for which the fingerprint cache effect cannot be expected, for example.

In this case, the prescribed condition can be that a prescribed information is described in the message header, for example. More specifically, the prescribed condition can be that an information indicating the GET method and an information indicating the request are described in the message header, for example. As another example, the prescribed condition can be that data to be transferred is null or in a very compact size. Of course there are many other variations for the prescribed condition, and it is also possible to use a plurality of conditions in combination.

Next, with references to FIG. 6A to FIG. 10, the message format to be used between proxies (for a message that is a target for applying the FP compression) at a time of the data transfer between the server side proxy 30 and the client side proxy 40 will be described.

The message that is not a target for applying the FP compression can be transferred between proxies in an original message format (at a time of receiving it at the FP compression side (transmitting side) proxy) without making any change. It is also possible to transfer such a message by providing an information capable of identifying that this message is not a target for applying the FP compression in the message header, for example, at the FP compression side (transmitting side) proxy.

Now, in the case of the data transfer between the server side proxy 30 and the client side proxy 40, the messages that are targets for applying the FP compression include those messages (compressed messages) in which data is FP compressed and replaced with the fingerprint and those messages (non-compressed messages) in which data is loaded without applying the FP compression.

The non-compressed message format is used when data contained in the message is not registered in the fingerprint cache. On the other hand, the compressed message format is used when data contained in the message is registered in the fingerprint cache.

At the decompression side (receiving side), the registration of data into the fingerprint cache can be carried out at a timing of receiving the message in the non-compressed format.

FIGS. 6A and 6B show exemplary message formats, where FIG. 6A shows the non-compressed message and FIG. 6B shows the compressed message.

In FIG. 6A, the data is loaded on the message body, whereas in FIG. 6B, the fingerprint (FP) is loaded on the message body instead of the data. Also, in this example, an identification information for enabling identification of the presence or absence of the FP compression is described in a message header (at the compression side proxy), and the presence or absence of the FP compression is identified according to this identification information (at the decompression side proxy) (the compression is absent if it is 0, the compression is present if it is 1, for example). Note that the identification information can be a special one to be used between proxies or one that utilizes a field already existing in the ordinary HTTP message header, either independently or in combination with the original purpose of that field.

Note that, in the example of FIG. 6A, in the case of the non-compression, the fingerprint is not included in the message but it is also possible to include the fingerprint in the message body in addition to the data, or it is also possible to include the fingerprint in the message header as shown in FIG. 7. In this way, it is possible to omit a task to obtain the fingerprint from the data again at a time of carrying out the registration of the data into the fingerprint cache at the decompression side, because the fingerprint included in the message can be utilized directly.

Note that, in the case where messages that are not targets for applying the FP compression can exist, it is also possible for the decompression side (receiving side) to judge whether it is a message that is a target for applying the FP compression or a message that is not a target for applying the FP compression according to whether the above described identification information is contained in the message header or not. It is also possible to provide the identification information in the header of the message that is not a target for applying the FP compression, so as to identify three types of the messages by this identification information (a message that is not a target for applying the FP compression if it is 01, (a message that is a target for applying the FP compression and) the compression is absent if it is 10, and (a message that is a target for applying the FP compression and) the compression is present if it is 11, for example).

Here, a concrete example of a message in the format of FIG. 6A is shown in FIG. 32, and a concrete example of a message in the format of FIG. 6B is shown in FIG. 33. In FIGS. 32 and 33, "Fingerprint-Mode: . . ." in the header corresponds to the identification information, and "6E39 . . . 0128" in the body of FIG. 33 corresponds to the fingerprint.

Also, a concrete example of a message in the format of FIG. 7 is shown in FIG. 34. In FIG. 34, "Fingerprint: . . ." in the header corresponds to the fingerprint.

Figure 8A:
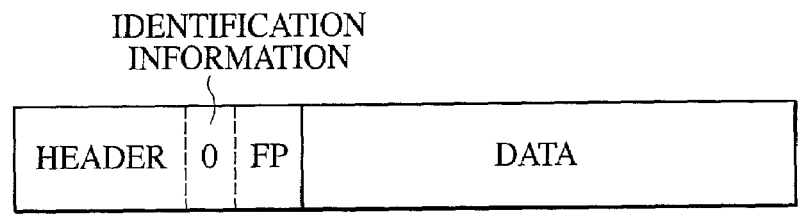
FIGS. 8A and 8B are diagrams showing another exemplary message formats that can be used in one embodiment of the present invention.
Figure 8B:
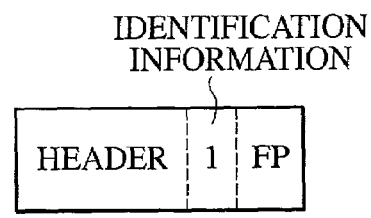

FIGS. 8A and 8B show another exemplary message formats, where FIG. 8A shows the non-compressed message and FIG. 8B shows the compressed message.

In FIG. 8A, the data is loaded on the message body, whereas in FIG. 8B, the message body is null. Also, in this example, the fingerprint (FP) is described in the message header in both formats. The identification information for enabling identification of the presence or absence of the FP compression is the same as in the above described example.

Note that, in this case, it is also possible to use the message format similar to that of FIG. 6A in the case of the non-compression (a format that does not contain the fingerprint).

Note that, in the case where messages that are not targets for applying the FP compression can exist and the compression side (transmitting side) proxy has a configuration for always describing the fingerprint in the message header of the message that is a target for applying the FP compression, it is also possible for the decompression side (receiving side) to judge whether it is a message that is a target for applying the FP compression or a message that is not a target for applying the FP compression according to whether the fingerprint is contained in the message header or not, besides the method based on the identification information described above.

Here, a concrete example of a message in the format of FIG. 8A is shown in FIG. 35, and a concrete example of a message in the format of FIG. 8B is shown in FIG. 36.

Figure 9A:
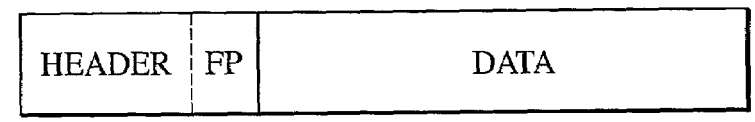
FIGS. 9A and 9B are diagrams showing another exemplary message formats that can be used in one embodiment of the present invention.
Figure 9B:
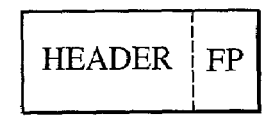

FIGS. 9A and 9B show still another exemplary message formats, where FIG. 9A shows the non-compressed message and FIG. 9B shows the compressed message.

In FIG. 9A, the data is loaded on the message body, whereas in FIG. 9B, the message body is null. Also, in this example, the fingerprint (FP) is described in the message header in both formats. However, in this example, the identification information for enabling identification of the presence or absence of the FP compression is not used.

In this example, the presence or absence of the FP compression can be identified according to whether the message body is null or not. However, in the case where messages that are not targets for applying the FP compression and that have the null message body can exist, it is possible to judge whether it is the compressed message that is a target for applying the FP compression or a message that is not a target for applying the FP compression and that has the null message body according to whether the fingerprint is contained in the message header or not, for example. It is also possible to provide an information indicating whether it is a message that is a target for applying the FP compression or not in the message header.

Figure 10:
FIG. 10 is a diagram showing another exemplary message format that can be used in one embodiment of the present invention.

Note that it is also possible to use a format in which the fingerprint is not described in the message as shown in FIG. 10 in the case of the non-compression. In this case, it is possible to identify the presence or absence of the FP compression according to whether the fingerprint is contained in the message header or not. However, in the case where messages that are not targets for applying the FP compression can exist, it is possible to provide an information indicating whether it is a message that is a target for applying the FP compression or not in the message header, for example.

Here, a concrete example of a message in the format of FIG. 9A is shown in FIG. 37, and a concrete example of a message in the format of FIG. 9B is shown in FIG. 38.

Also, a concrete example of a message in the format of FIG. 10 is shown in FIG. 39.

In the following, the operation in the case of applying the FP compression/decompression to the reply data at a time of transferring the reply message from the server side proxy 30 to the client side proxy 40 will be described in detail.

FIG. 11 shows an exemplary configuration of the server side proxy 30 in this embodiment, and FIG. 12 shows an exemplary configuration of the client side proxy 40 in this embodiment. Note that FIG. 11 and FIG. 12 mainly show configurations relevant to the data transfer from the server side proxy 30 to the client side proxy 40.

As shown in FIG. 11, the server side proxy 30 has a reception unit 31 for carrying out a processing for receiving a transfer message from the LAN 12 inside the ASP server center 2 or the wide area network 14, a processing unit 32 for applying the FP compression to data contained in the transfer message, a transmission unit 33 for carrying out a processing for transmitting the transfer message to the LAN 12 inside the ASP server center 2 or the wide area network 14, and a fingerprint cache (FP cache) 34 for storing the fingerprint and its source data in correspondence. Also, the processing unit 32 has a fingerprint (FP) compression judgement unit 321 for judging whether the data contained in the transfer message should be a compression target or not, a fingerprint cache (FP cache) management unit 322 for carrying out the search and the registration with respect to the fingerprint cache 34, and a fingerprint (FP) compression processing unit 323 for carrying out a processing for replacing the data contained in the transfer message with the corresponding fingerprint.

As shown in FIG. 12, the client side proxy 40 has a reception unit 41 for carrying out a processing for receiving a transfer message from the LAN 16 inside the user's office 4 or the wide area network 14, a processing unit 42 for applying the FP decompression to data contained in the transfer message, a transmission unit 43 for carrying out a processing for transmitting the transfer message to the LAN 16 inside the user's office 4 or the wide area network 14, and a fingerprint cache (FP cache) 44 for storing the fingerprint and its source data in correspondence. Also, the processing unit 42 has a fingerprint (FP) compression judgement unit 421 for judging whether the data contained in the transfer message should be a compression target or not and the presence or absence of the FP compression with respect to the transfer message, a fingerprint cache (FP cache) management unit 422 for carrying out the search and the registration with respect to the fingerprint cache 44, and a fingerprint (FP) decompression processing unit 423 for carrying out a processing for decompressing the original data from the fingerprint contained in the FP compressed transfer message.

Note that the FP compression judgement unit 321 on the compression side and the FP compression judgement unit 421 on the decompression side judge whether the data contained in that message should be a target for applying the FP compression or not, by checking whether the message satisfies a prescribed condition or not as described above. In the case of setting every message as a target for applying the FP compression, the FP compression judgement unit 321 on the compression side and the corresponding part of the exemplary procedure to be described below are unnecessary, and the FP compression judgement unit 421 on the decompression side and the corresponding part of the exemplary procedure to be described below are also unnecessary. Note also that the FP compression judgement unit 421 on the decompression side judges whether the data of the message that is a target for applying the FP compression is FP compressed or not.

In the following, the case of transferring the message that is a target for applying the FP compression (the case in which the message is judged as a target for applying the FP compression or the case in which every message is set as a target for applying the FP compression) will be mainly described.

In the following, the operation in the case where the reply data transmitted by the server is transferred from the server side proxy 30 to the client side proxy 40 will be described first, and the operation in the case where the request data that is a source of the reply data to be transmitted by the server is transferred from the client side proxy 40 to the server side proxy 30 will be described next.

Figure 13:
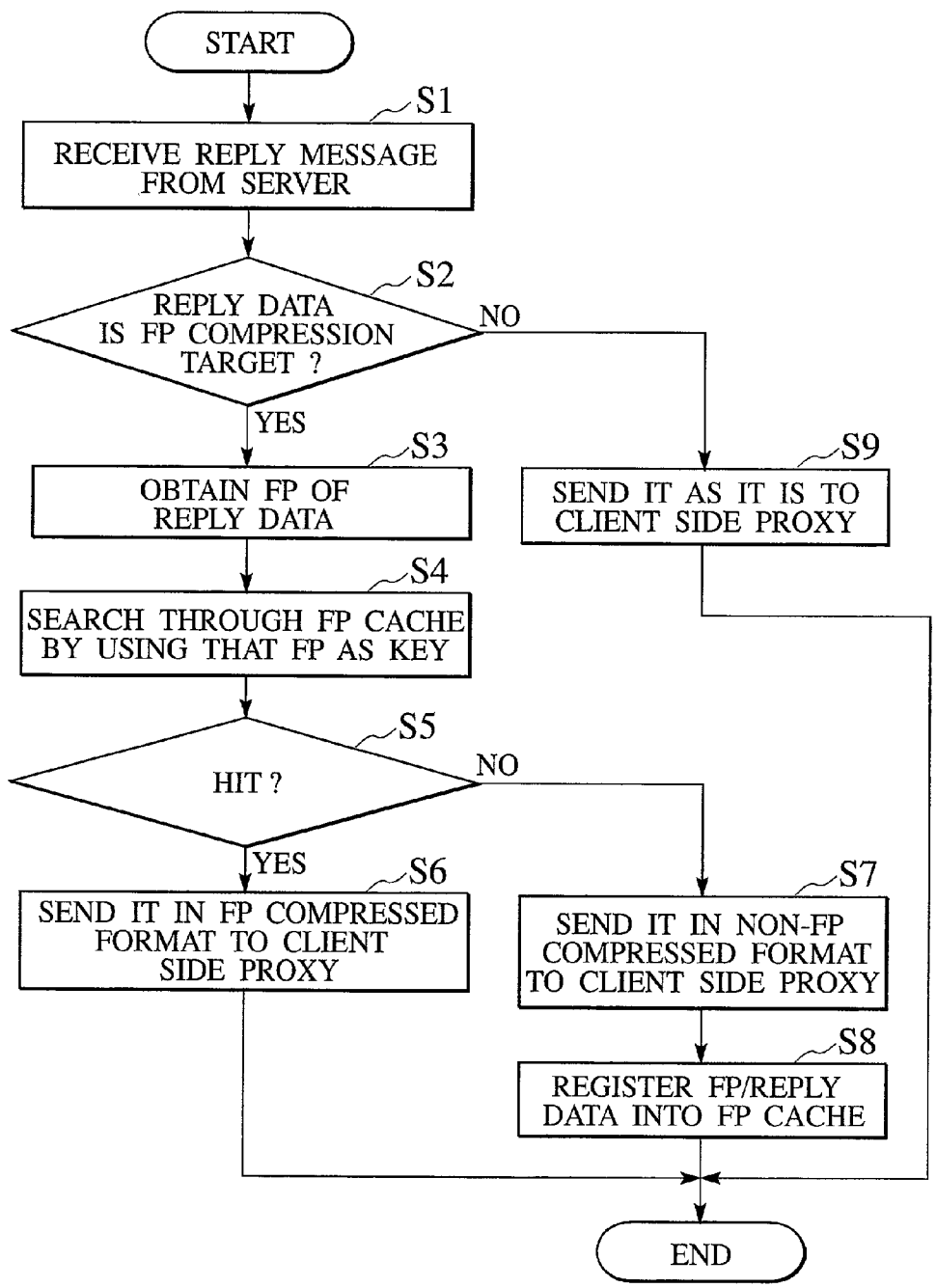
FIG. 13 is a flow chart showing one exemplary processing procedure of the server side proxy of FIG. 11 according to one embodiment of the present invention.

FIG. 13 shows an exemplary processing procedure of the server side proxy 30 at a time of transferring the reply message from the server side proxy 30 to the client side proxy 40. Note that FIG. 13 shows the processing in the case of receiving one reply message, but in practice the server side proxy 30 carries out the processing shown in FIG. 13 with respect to every received reply message.

The server side proxy 30 receives the reply message from the server 20 at the reception unit 31 (step S1).

The FP compression judgement unit 321 checks and judges whether the reply data of this reply message is a target for applying the FP compression or not (step S2). When the reply data is judged as not a target for applying the FP compression (step S2 NO), the received reply message is transferred to the client side proxy 40 from the transmission unit 33 (step S9).

When the reply data of this reply message is judged as a target for applying the FP compression at the step S2, the fingerprint value of this reply data is calculated at the FP cache management unit 322 (step S3), and the fingerprint cache 34 is searched through by using this fingerprint value as a key (step S4).

When a set of this fingerprint value and the corresponding data is registered in the fingerprint cache 34 (step S5 YES), the received reply message is converted into the FP compression format (of FIG. 8B, for example) by using this fingerprint value at the FP compression processing unit 323, and transmitted to the client side proxy 40 from the transmission unit 33 (step S6). At this point, a value of a field indicating the data length (Content-Length field) in the reply header is set in accordance with the FP compression format, according to the need.

On the other hand, when a set of this fingerprint value and the corresponding data is not registered in the fingerprint cache 34 as a result of the search of the step S4 (step S5 NO), the following two operations are carried out.

(1) The received reply message is converted into a non-FP compression format (of FIG. 8A, for example) (by using this fingerprint value according to the need) at the FP compression processing unit 323, and transmitted to the client side proxy 40 from the transmission unit 33 (step S7).

(2) This fingerprint value and this reply data are set in correspondence (the fingerprint value is set as a key) and registered into the fingerprint cache 34 at the FP cache management unit 322 (step S8).

Note that these operations (1) and (2) can be carried out in any desired order or in parallel.

Figure 14:
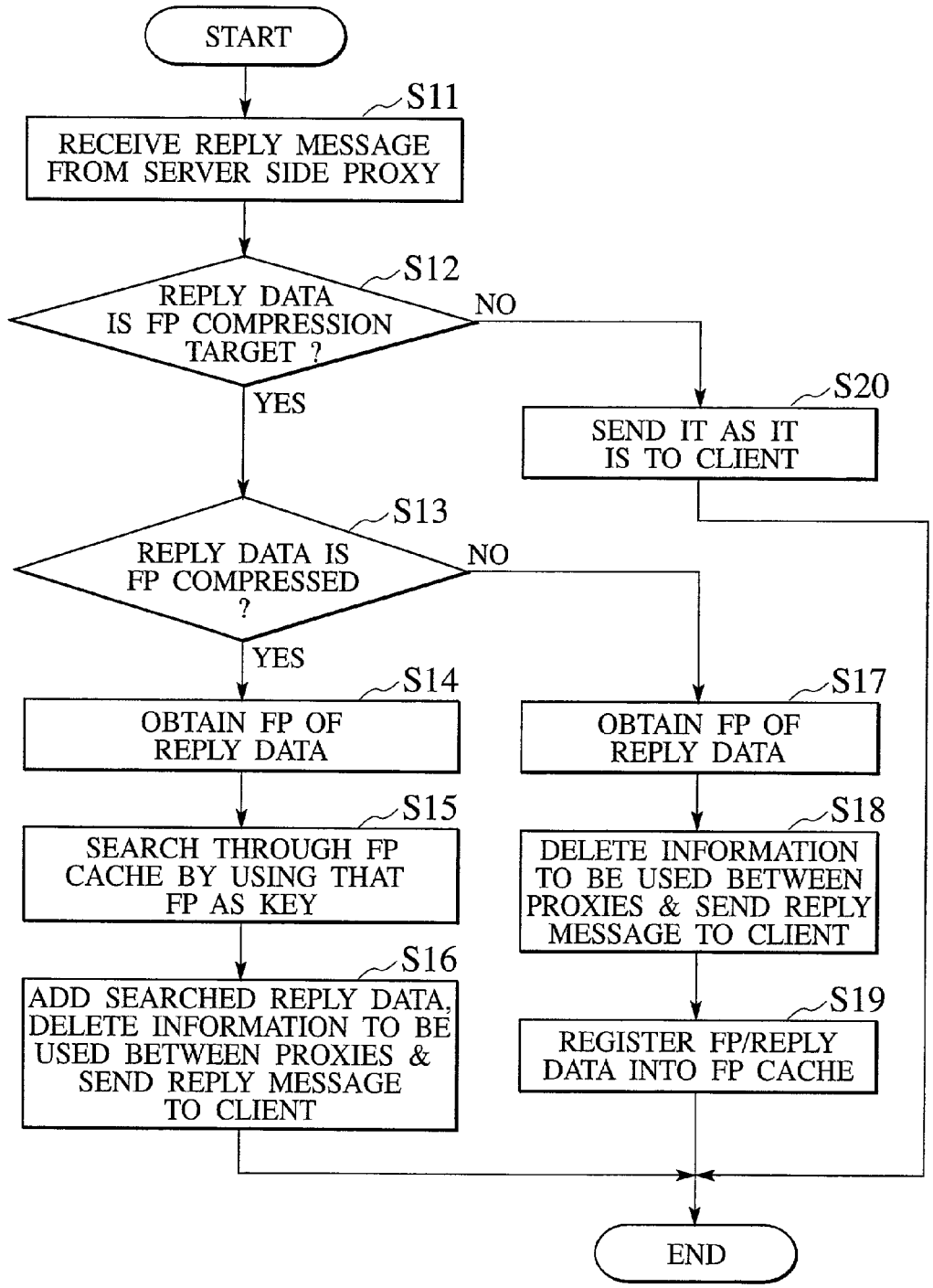
FIG. 14 is a flow chart showing one exemplary processing procedure of the client side proxy of FIG. 12 according to one embodiment of the present invention.

Next, FIG. 14 shows an exemplary processing procedure of the client side proxy 40 at a time of transferring the reply message from the server side proxy 30 to the client side proxy 40. Note that FIG. 14 shows the processing in the case of receiving one reply message, but in practice the client side proxy 40 carries out the processing shown in FIG. 14 with respect to every received reply message.

The client side proxy 40 receives the reply message from the server side proxy 30 at the reception unit 41 (step S11).

The FP compression judgement unit 421 checks and judges whether the reply data of this reply message is a target for applying the FP compression or not (step S12). When the reply data is judged as not a target for applying the FP compression (step S12 NO), the received reply message is transferred to the client 50 from the transmission unit 43 (step S20).

When the reply data of this reply message is judged as a target for applying the FP compression at the step S12, the FP compression judgement unit 421 also checks and judges whether the reply data is FP compressed or not (step S13).

When the reply data of this reply message is judged as FP compressed (as shown in FIG. 8B, for example) at the step S13, the fingerprint value of this reply data is obtained at the FP cache management unit 422 (step S14), and the fingerprint cache 44 is searched through by using this fingerprint value as a key (step S15).

Then, the data corresponding to this fingerprint value obtained from the fingerprint cache 44 is attached to the received reply message and a special information to be used between the proxies is deleted in the case of using such an information at the FP decompression processing unit 423, and the resulting reply message is transmitted to the client 50 from the transmission unit 43 (step S16). At this point, a value of a field indicating the data length (Content-Length field) in the reply header is set to be a length of the data corresponding to this fingerprint value, according to the need.

On the other hand, when the reply data of this reply message is judged as not FP compressed (as shown in FIG. 8A, for example) at the step S13, the following two operations are carried out.

(1) The special information to be used between the proxies is deleted from the received reply message in the case of using such an information at the FP decompression processing unit 423, and the resulting reply message is transmitted to the client 50 from the transmission unit 43 (step S18).

(2) The fingerprint value of this reply data is obtained (step S17), and this fingerprint value and this reply data are set in correspondence (the fingerprint value is set as a key) and registered into the fingerprint cache 44 at the FP cache management unit 422 (step S19).

Note that these operations (1) and (2) can be carried out in any desired order or in parallel.

Here, the fingerprint value can be obtained at the step S14 from the fingerprint that is described in the message. However, the step S17 can use a method for obtaining the fingerprint from the message when the fingerprint is described in the message or a method for calculating the fingerprint value by using the hash function or the like from the reply data when the fingerprint is not described in the message. It is also possible to use a method for calculating the fingerprint value from the reply data even when the fingerprint is described in the message.

Note also that it is possible to carry out the step S14 or the step S17 between the step S12 and the step S13, and it is also possible to carry out the step S17 between the step S18 and the step S19. Note also that the judgement of the step S12 and the judgement of the step S13 can be made simultaneously.

Figure 15:
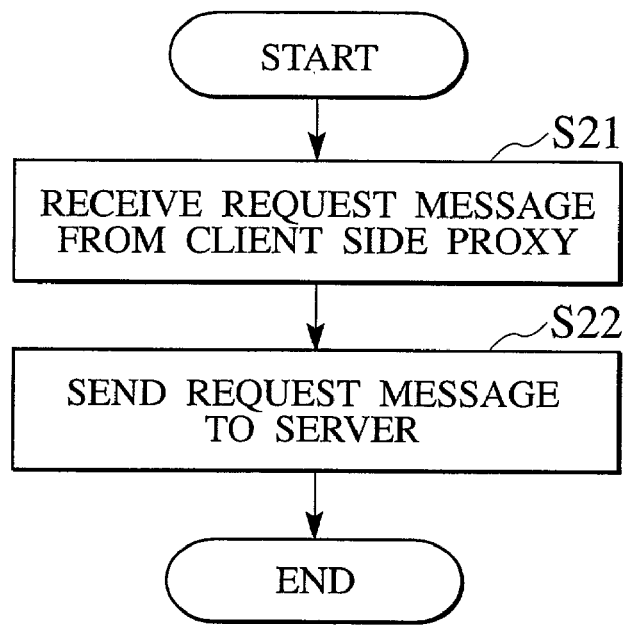
FIG. 15 is a flow chart showing another exemplary processing procedure of the server side proxy of FIG. 11 according to one embodiment of the present invention.
Figure 16:
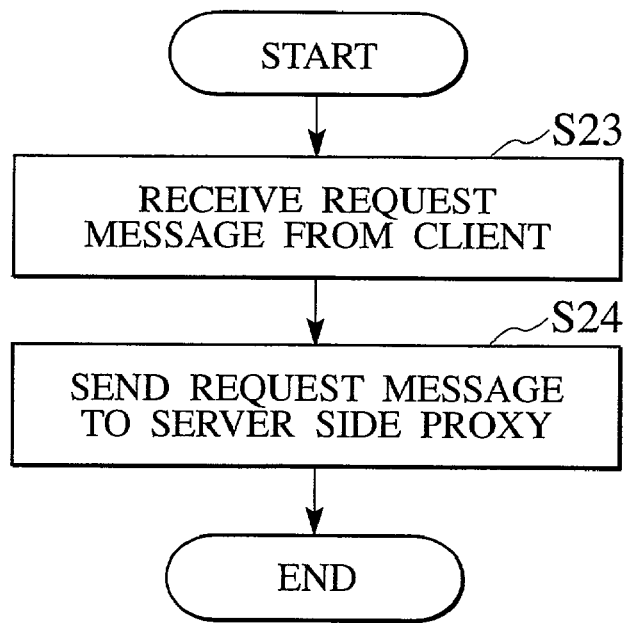
FIG. 16 is a flow chart showing another exemplary processing procedure of the client side proxy of FIG. 12 according to one embodiment of the present invention.

Note also that, in the case of not using the fingerprint cache at a time of transferring the request message from the client side proxy 40 to the server side proxy 30, the server side proxy 30 can carry out a procedure shown in FIG. 15 in which the server side proxy 30 receives the request message from the client side proxy 40 (step S21), and transmits it to the server 20 (step S22). Similarly, the client side proxy 40 can carry out a procedure shown in FIG. 16 in which the client side proxy 40 receives the request message from the client 50 (step S23) and transmits it to the server side proxy 30 (step S24).

In the following, the data transfer utilizing the fingerprint cache will be described in further detail with references to FIG. 17 (for a time of the registration, i.e., a time of the non-FP compression) and FIG. 18 (for a time of the FP compression).

First, with reference to FIG. 17, the operation in the case of transferring data that is not registered in the fingerprint cache from the server side proxy 30 to the client side proxy 40 while registering this data into the fingerprint cache will be described.

(1) Suppose that the browser or the like on the client 50 issued the request message of the POST method to the server 20 by using the URL of "/A.cgi", for example. Here, the browser or the like is set in advance to send the request message for the server 20 to the client side proxy 40 first.

(2) The client side proxy 40 that received the request message from the client 50 transfers this request message to the server side proxy 30.

(3) The server side proxy 30 that received the request message transfers this request message to the server 20.

(4) The server 20 carries out a processing with respect to this request message, and then returns the reply message to the server side proxy 30.

(5) The server side proxy 30 that received the reply message calculates the fingerprint of the reply data contained in the received reply message first, and checks whether the data having this fingerprint name exists in the fingerprint cache 34 or not. If it does not exist, it is the first time data (including the case where it is the first time data after this data was registered into the fingerprint cache once and then deleted or invalidated later on, in the case of using a configuration in which the data that is once registered into the fingerprint cache can be deleted or invalidated later on), so that this data is entered (registered) into the fingerprint cache 34 by using the fingerprint as its name.

(6) The server side proxy 30 transfers the reply message to the client side proxy 40.

Note that, as described above, when the reply message that contains the fingerprint value calculated from the reply data in the reply header or the like is sent, it is possible to omit a task for calculating the fingerprint again at the client side proxy 40.

(7) The client side proxy 40 that received the reply message registers the reply data into the fingerprint cache 44 because it is the first time data.

Note that, as described above, either the fingerprint is calculated from the reply data or the fingerprint that is entered into the reply header or the like by the server side proxy 30 is taken out and this fingerprint is registered as a name.

(8) The client side proxy 40 returns the reply message to (the browser or the like operating on) the client 50 (after deleting an information to be used only between the server side proxy 30 and the client side proxy 40 such as the fingerprint value in the case of a configuration in which such an information exists in the reply header or the like).

Note that the fingerprint cache registration of the above described (5) at the server side proxy 30 can be carried out after the operation of the above described (6). Also, the fingerprint cache registration of the above described (7) at the client side proxy 40 can be carried out after the operation of the above described (8).

Next, with reference to FIG. 18, the operation in the case of transferring data that is registered in the fingerprint cache by the operation of FIG. 17 from the server side proxy 30 to the client side proxy 40 will be described.

Figure 17:
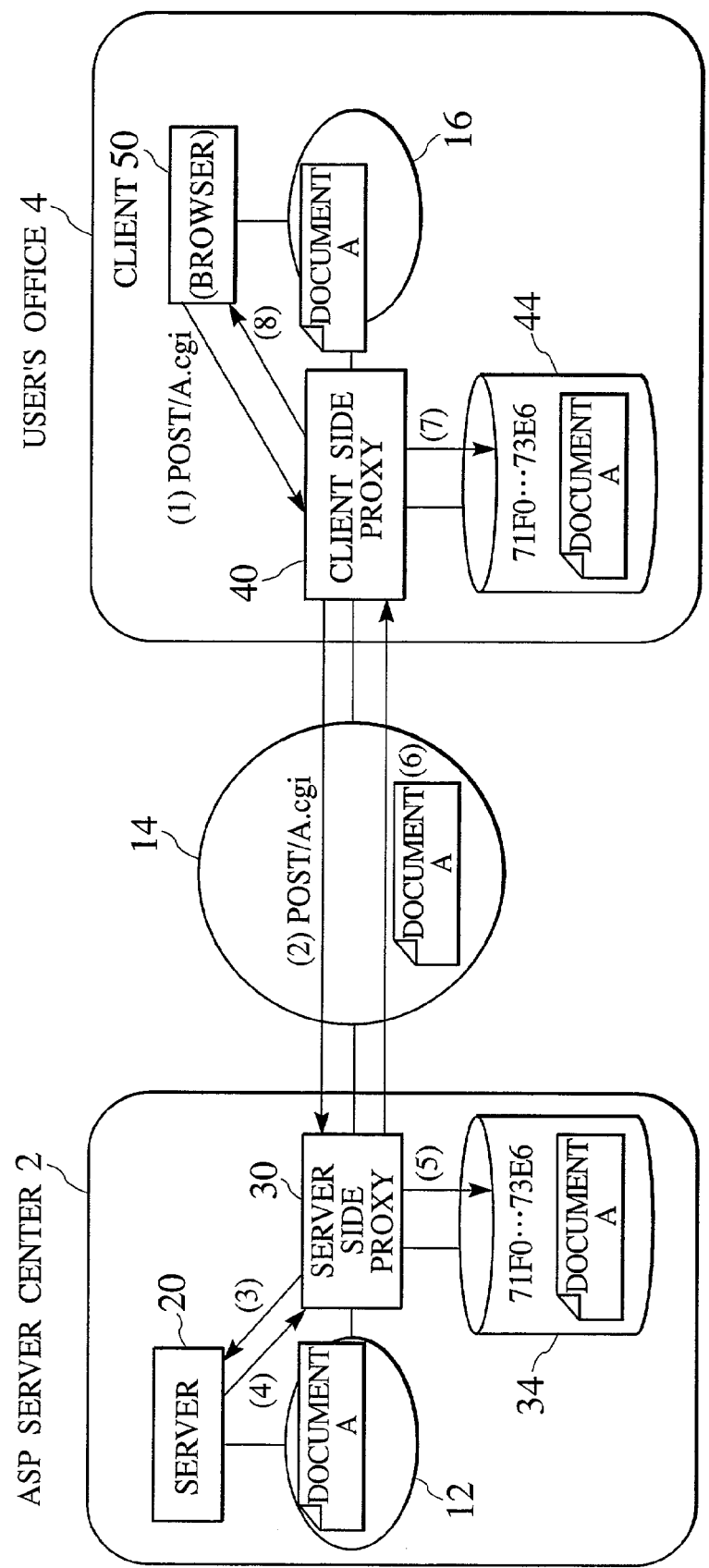
FIG. 17 is a diagram for explaining one exemplary data transfer between the server side proxy of FIG. 11 and the client side proxy of FIG. 12 according to one embodiment of the present invention.

(1) to (4) are the same as (1) to (4) in the operation of FIG. 17.

(5) The server side proxy 30 that received the reply message from the server 20 calculates the fingerprint of the reply data contained in the received reply message first, and checks whether the data having this fingerprint name exists in the fingerprint cache 34 or not. If it exists, it is the data that had been sent in the past (the data registered in the fingerprint cache), so that the reply data is replaced with the fingerprint (by entering the fingerprint value into the reply header and making the reply body null as described above, for example).

(6) The server side proxy 30 transfers the reply message in which the reply data is replaced with the fingerprint to the client side proxy 40.

(7) The client side proxy 40 that received the reply message detects that the reply data is replaced with the fingerprint, takes out the corresponding data from the fingerprint cache 44 by using the fingerprint (specified by the reply header or the like as described above, for example), and enters this data into the reply body.

(8) The client side proxy 40 returns the reply message to (the browser or the like operating on) the client 50 (after deleting an information to be used only between the server side proxy 30 and the client side proxy 40 such as the fingerprint value in the case of a configuration in which such an information exists in the reply header or the like).

Note that each one of the fingerprint caches of the server side proxy 30 and the client side proxy 40 has an upper limit for its capacity so that it is preferable to sequentially delete old data or data that are less likely to be used, for example, by carrying out the garbage collection according to a prescribed algorithm.

However, in this case, there can be data which is still existing in the fingerprint cache 34 of the server side proxy 30 but which is already deleted in the fingerprint cache 44 of the client side proxy 40, so that there can be cases where an attempt to take out the reply data from the fingerprint cache 44 by using the fingerprint is made at the client side proxy 40 at the above described (7) but the corresponding set of the fingerprint and the data no longer exists in the fingerprint cache 44. In such cases, it is possible to provide a mechanism in which the client side proxy 40 requests the server side proxy 30 to send the data corresponding to the specified fingerprint, and the requested server side proxy 30 takes out the data corresponding to the specified fingerprint from the fingerprint cache 34 and returns this data, for example.

On the contrary, when there exists data which is already deleted from the fingerprint cache 34 of the server side proxy 30 but which is still existing in the fingerprint cache 44 of the client side proxy 44, the fingerprint and the reply data that are registered at that timing can be overwritten at a time of registering the fingerprint and the reply data into the fingerprint cache 44 at the client side proxy 40 by the above described (7) in the operation of FIG. 17.

Figure 18:
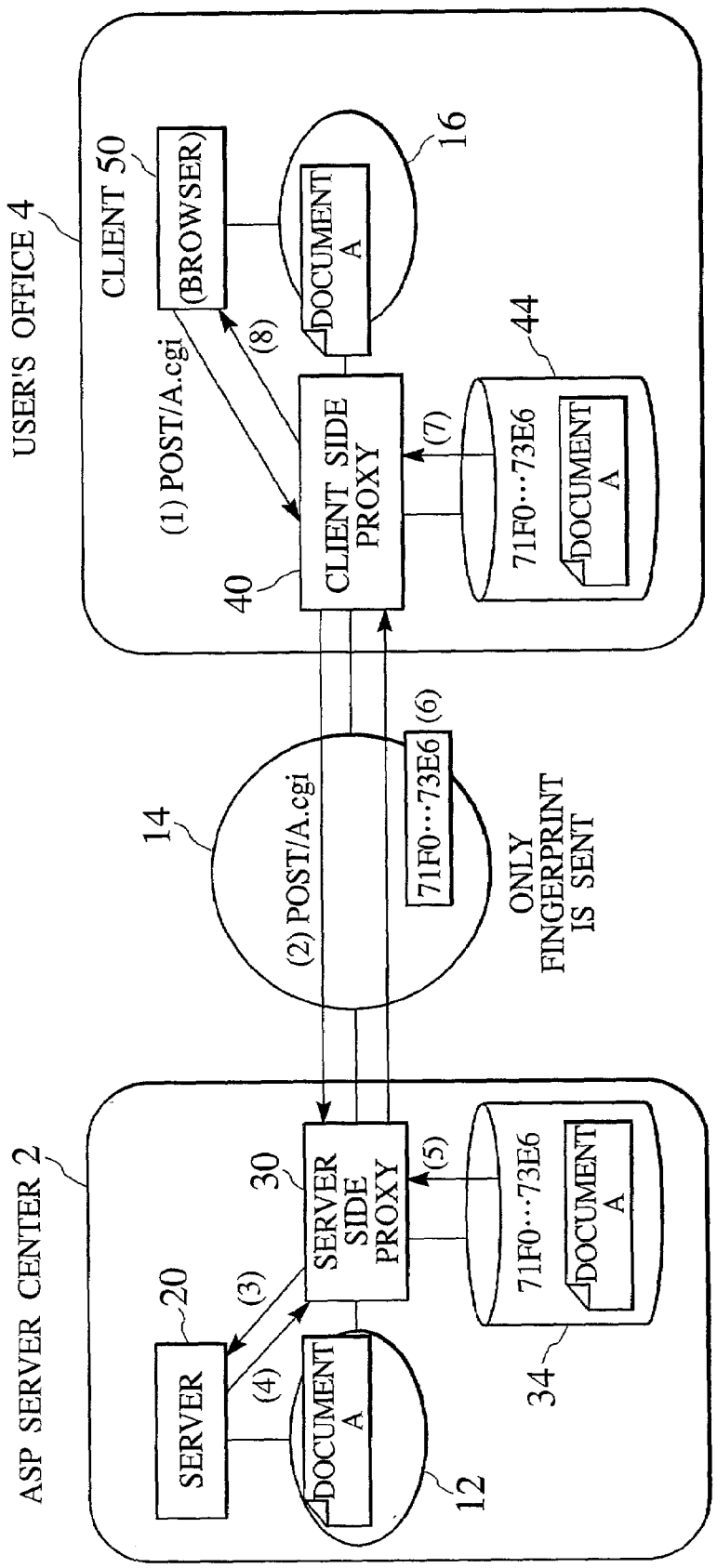
FIG. 18 is a diagram for explaining another exemplary data transfer between the server side proxy of FIG. 11 and the client side proxy of FIG. 12 according to one embodiment of the present invention.

In the above described (5) in the operation of FIG. 18, the processing assumes that when the fingerprint of the reply data is obtained and this fingerprint exists in the fingerprint cache 34 at the server side proxy 30, the same data as this reply data exists in correspondence with this fingerprint in the fingerprint cache 34. This method is sufficient if it is assumed that the same fingerprint will not be generated from different data in practice, but there is also a method for eliminating an error that can be caused when the same fingerprint is generated from different data which occurs at a very small probability.

In this case, when the fingerprint obtained from the reply data exists in the fingerprint cache 34, the data existing in the fingerprint cache 34 in correspondence with this fingerprint is compared with that reply data to judge whether they are the same or not. At this point, the processing in the case where it is judged that the fingerprint is the same but data with different contents are registered can be any of the following.

This fingerprint will not be used thereafter (in which case the data that gives this fingerprint will not be cached thereafter).

The fingerprint and the data that are registered earlier will be given the priority (in which case the other data that gives the same fingerprint as the registered fingerprint will not be cached while this fingerprint is registered).

The fingerprint and the data to be currently registered will be given the priority (in which case the registered data will be sequentially updated by the other data that gives the same fingerprint).

Note that it is also possible to provide a correspondence table (URL-FP table) for the URL and the fingerprint to be described below in the server side proxy 30 or the client side proxy 40 of this embodiment, and use it in combination with the fingerprint cache to realize the operation of the shared cache for the proxy server as well. Whether or not to provide this function can be determined for each individual server side proxy 30 or each individual client side proxy 40 separately.

First, the client side proxy 40 provided with the above described function will be described.

Figure 19:
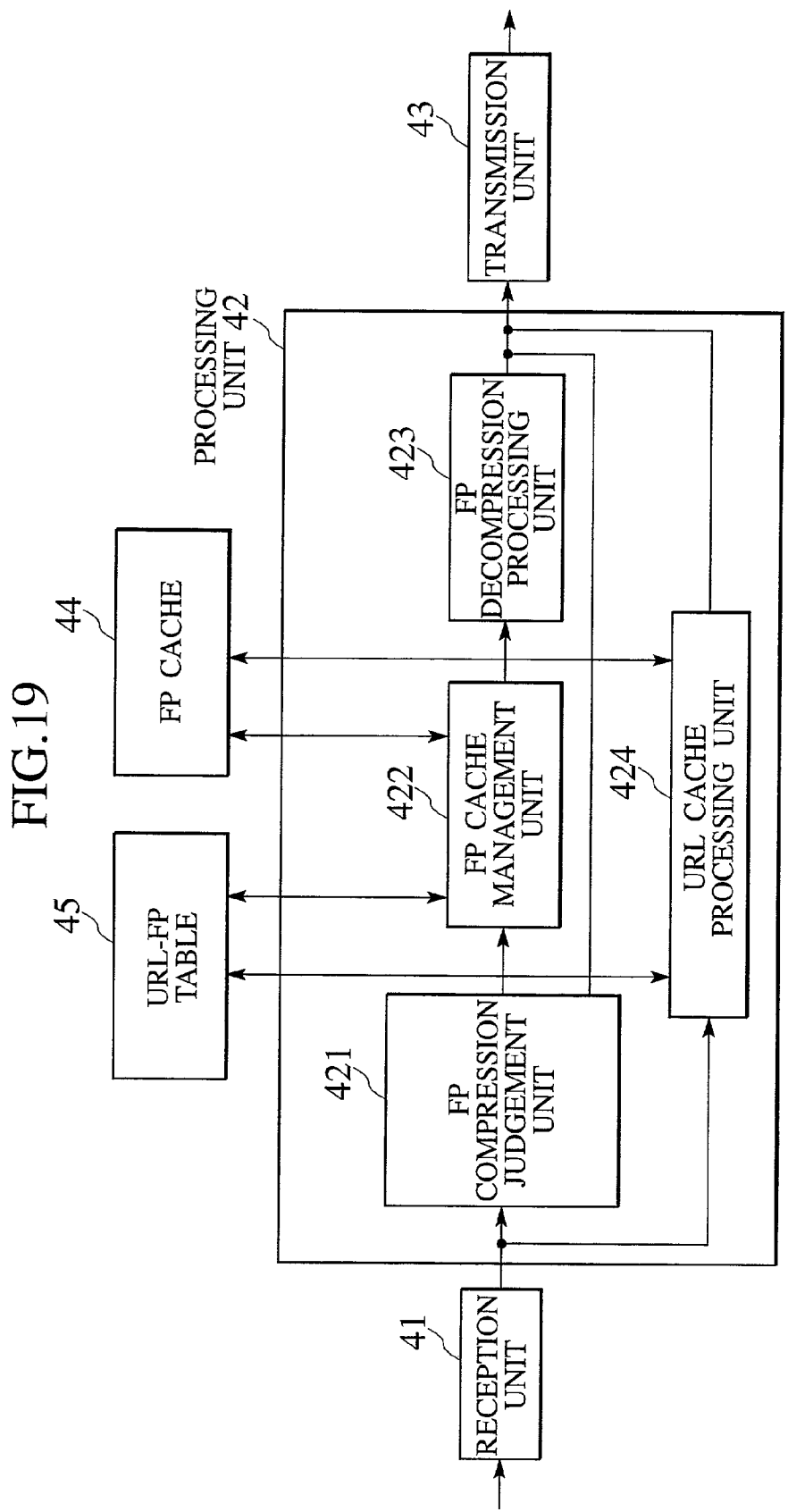
FIG. 19 is a block diagram showing another exemplary configuration of a client side proxy according to one embodiment of the present invention.

FIG. 19 shows an exemplary configuration of the client side proxy 40 in this case. This client side proxy 40 has a URL-FP table 45 for storing a correspondence between a URL that was accessed in the past and the fingerprint of its reply data, and a URL cache processing unit 424, in addition to the configuration of FIG. 12.

Note that, in addition to the URL and the fingerprint, the URL-FP table 45 also records information on a MIME type contained in the reply header when the access was made by using that URL, a timestamp to be used in judging the valid period, etc. The URL-FP table 45 also records information that is necessary only in the case where the conventional shared cache is cachable.

Figure 20:
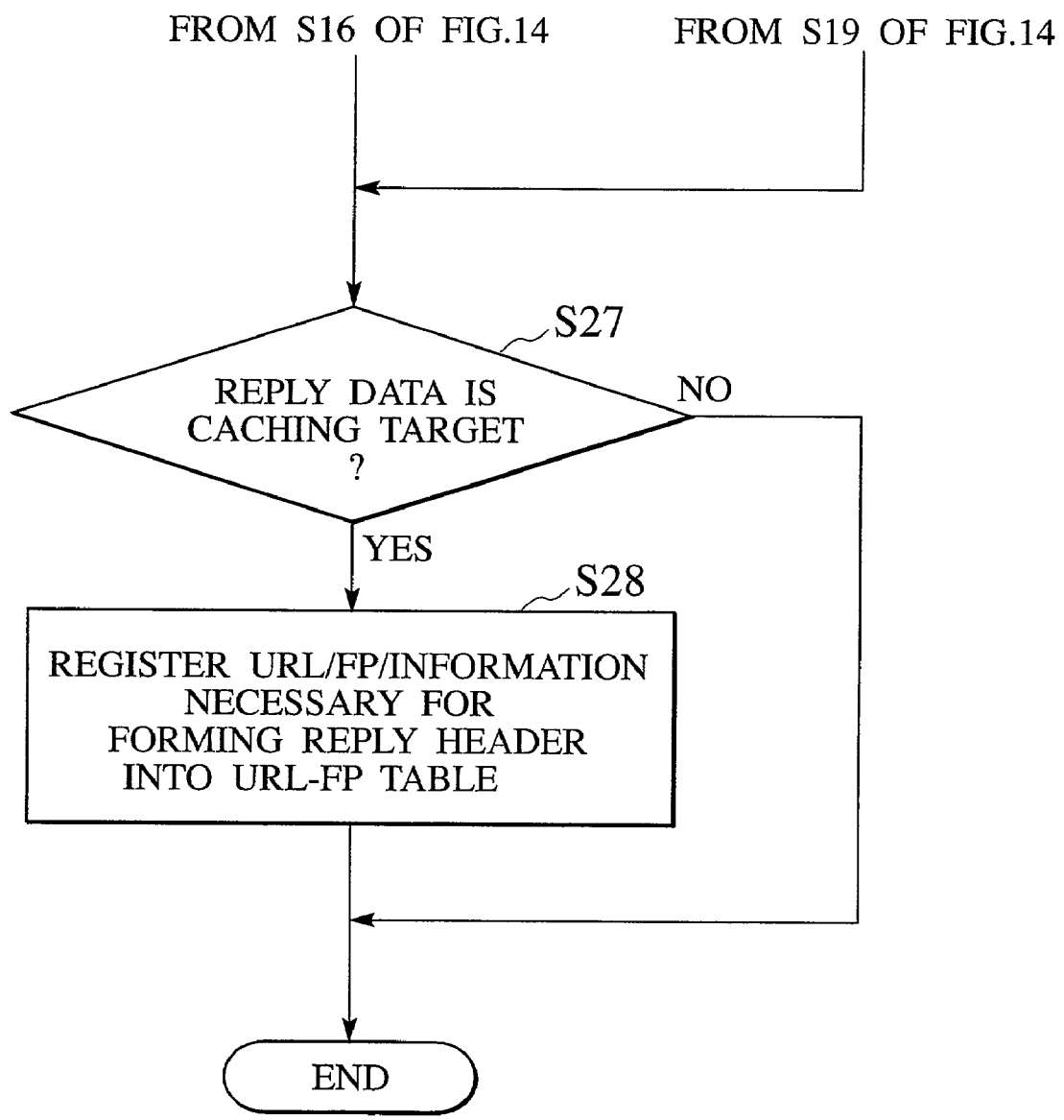
FIG. 20 is a flow chart showing one exemplary processing procedure of the client side proxy of FIG. 19 according to one embodiment of the present invention.

FIG. 20 shows an exemplary processing procedure of the client side proxy 40 at a time of transferring the reply message from the server side proxy 30 to the client side proxy 40.

Note that the processing procedure in this case is similar to that of FIG. 14 except that the steps S27 and S28 are added after the steps S16 and S19 of FIG. 14, and FIG. 20 only shows this part of the processing procedure which is to be added after the steps S16 and S19 of FIG. 14. Here, this part of the processing procedure to be added to that of FIG. 14 will be mainly described.

After transmitting the reply message to the client 50 from the transmission unit 43 (step S16 or S18), the client side proxy 40 checks and judges whether this reply message is the caching target or not at the URL cache processing unit 424 (step S27). When it is judged as the caching target, the URL, the fingerprint, and the information necessary for forming the reply header are set in correspondence (the URL is set as a key) and registered into the URL-FP table 45 at the URL cache processing unit 424 (step S28). When it is judged as not a caching target, no further operation will be carried out.

Note that the judgement of the step S27 and the registration into the URL-FP table at the step S28 can be carried out between the step S13 and the step S16 or S19.

Note also that the method for judging whether the received reply message is the caching target or not at a time of the registration can be similar to that used at a time of the registration conventionally. For example, the caching target can be set to be those reply messages of the GET method for which an information indicating the caching prohibition is not described in their headers.

Figure 21:
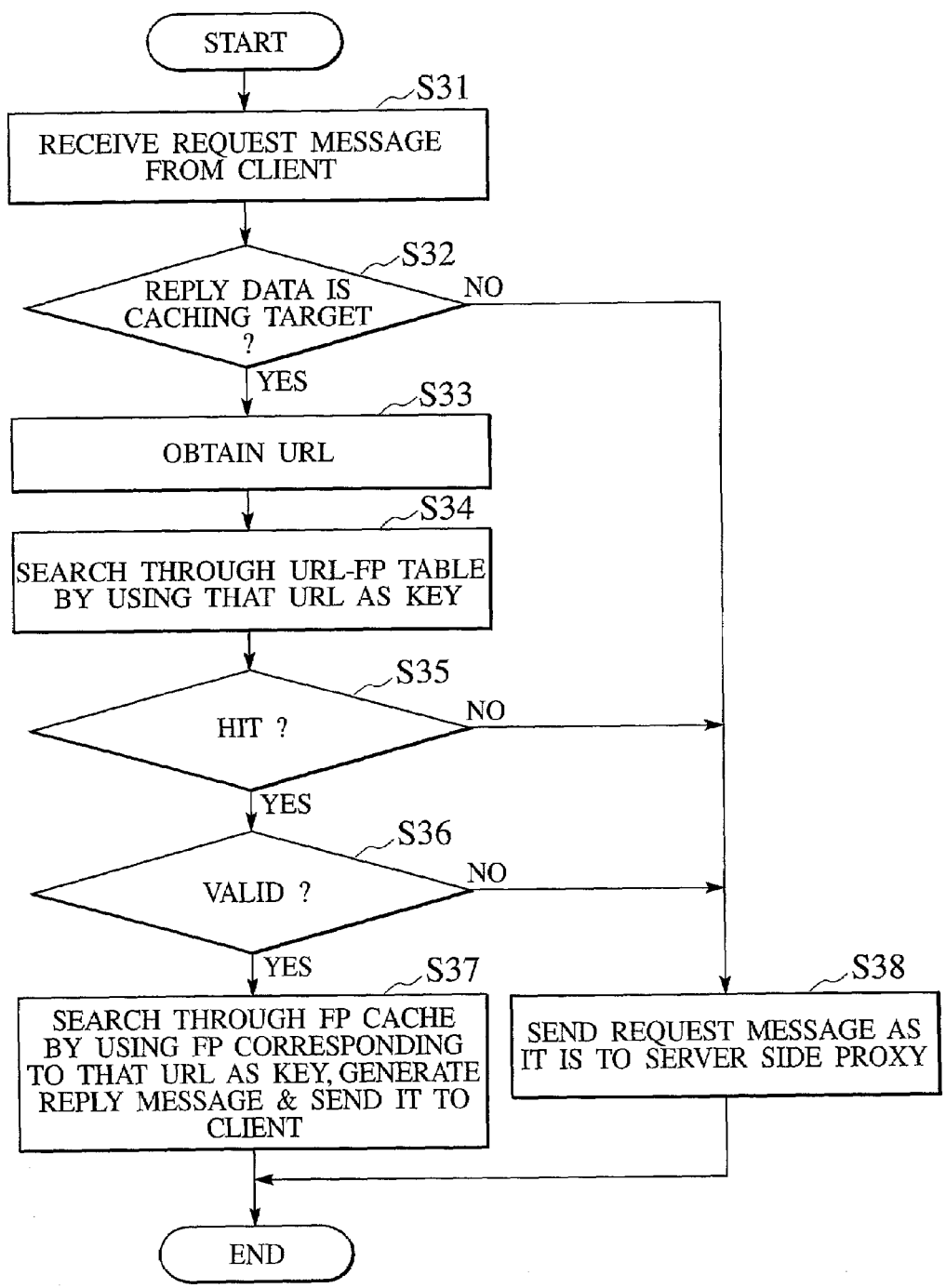
FIG. 21 is a flow chart showing another exemplary processing procedure of the client side proxy of FIG. 19 according to one embodiment of the present invention.

Next, FIG. 21 shows an exemplary processing procedure regarding the operation of the shared cache of the proxy server at the client side proxy 40 when the request message received from the client 50 is to be transferred from the client side proxy 40 to the server side proxy 30.

The client side proxy 40 receives the request message from the client 50 at the reception unit 41 (step S31).

The URL cache processing unit 424 checks and judges whether the reply message corresponding to the request message is the caching target or not (step S32). Note that the method for judging whether the reply message is the caching target or not at a time of the reply can be similar to that used at a time of the reply conventionally. For example, the caching target can be set to be the reply messages corresponding to the received request messages of the GET method.

When the reply message corresponding to the request message is judged as not the caching target (step S32 NO), the received request message is transferred to the server side proxy 30 from the transmission unit 43 (step S38).

When the reply message corresponding to the request message is judged as the caching target (step S32 YES), the URL cache processing unit 424 also takes out the URL specified in that request message (step S33) and searches through the URL-FP table 45 by using that URL as a key (step S34).

When the fingerprint of the reply data corresponding to that URL is not registered (step S35 NO), the received request message is transferred to the server side proxy 30 from the transmission unit 43 (step S38).

Also, when the fingerprint of the reply data corresponding to that URL is registered (step S35 YES) but it is judged that this data is invalid according to the information for judging the valid period that is recorded in correspondence (step S36 NO), the received request message is transferred to the server side proxy 30 from the transmission unit 43 (step S38). At this point, it is also possible to carry out the operation such that the request message is transferred to the server side proxy 30 by entering the timestamp of the currently recorded data into the If-Modified-Since header of the request message, and the operation proceeds to the step S37 upon receiving the reply message indicating that the currently recorded data is valid from the server side proxy 30.

On the other hand, when the fingerprint of the reply data corresponding to that URL is registered (step S35 YES) and it is judged that this data is valid according to the information for judging the valid period that is recorded in correspondence (step S36 YES), the URL cache processing unit 424 obtains the information necessary for forming the reply data from the URL-FP table 45, acquires the reply data by searching through the fingerprint cache 44 by using the fingerprint of the reply data corresponding to that URL as a key, generates the reply message from them, and transfers the reply message to the client 50 from the transmission unit 43 (step S37).

Figure 22:
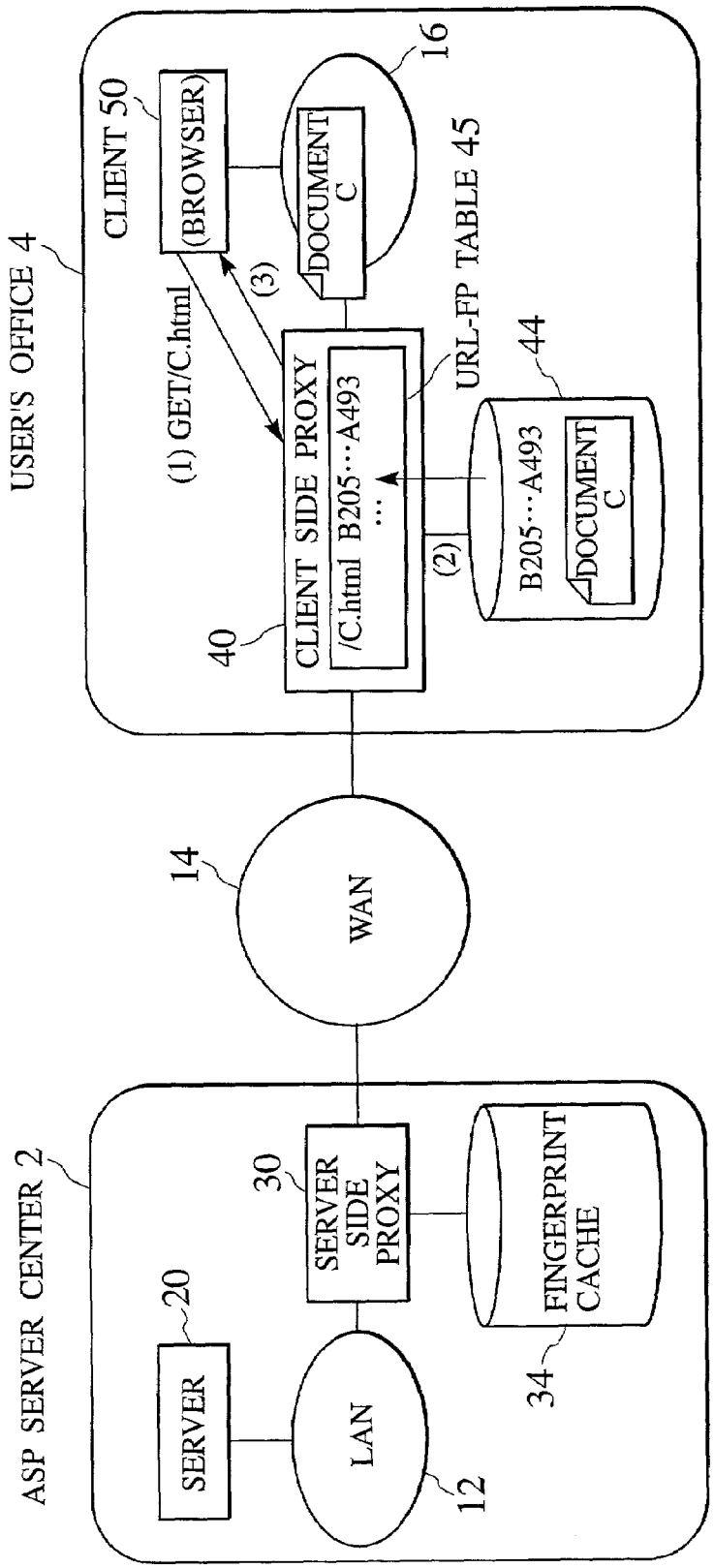
FIG. 22 is a diagram for explaining one exemplary data transfer between the server side proxy of FIG. 11 and the client side proxy of FIG. 19 according to one embodiment of the present invention.

In the following, the operation of the shared cache will be described in further detail with reference to FIG. 22 (for a time of the reply).

(1) Suppose that the browser or the like on the client 50 issued the request message of the GET method to the server 20 by using the URL of "/C.html", for example.

(2) When the request with a new URL is received, if that URL is registered in the URL-FP table 45, the judgement of the valid period is carried out similarly as the conventional shared cache, and if it is judged as valid, the fingerprint corresponding to that URL is obtained from the URL-FP table 45, the data having that fingerprint as a name is taken out from the fingerprint cache 44 as the reply data, and the reply header is formed by taking out the information necessary for forming the reply header such as the MIME type from the URL-FP table 45.

(3) The produced reply message is returned to (the browser or the like operating on) the client 50.

Note that it is also possible to carry out the operation such that, even in the case of the request message having the If-Modified-Since header which requests sending of the data only when the cache content is updated since the specified time, the URL-FP table 45 is looked up first, and if it is judged as not updated the reply message is produced and returned, or otherwise an inquiry to the server is made by rewriting the information of the If-Modified-Since header.

Next, the server side proxy 30 provided with the caching function will be described.

The caching function of the client side proxy 40 is described above, and the caching function of the server side proxy 30 can be realized similarly.

In this case, the roles of the client 50 which is the message transfer source and the server side proxy 30 which is the message transfer destination in the case of the client side proxy 40 are played by the client side proxy 40 (transfer source) and the server 20 (transfer destination) in the case of the server side proxy 30 respectively, and the configuration and the procedure regarding the caching are the same.

Figure 23:
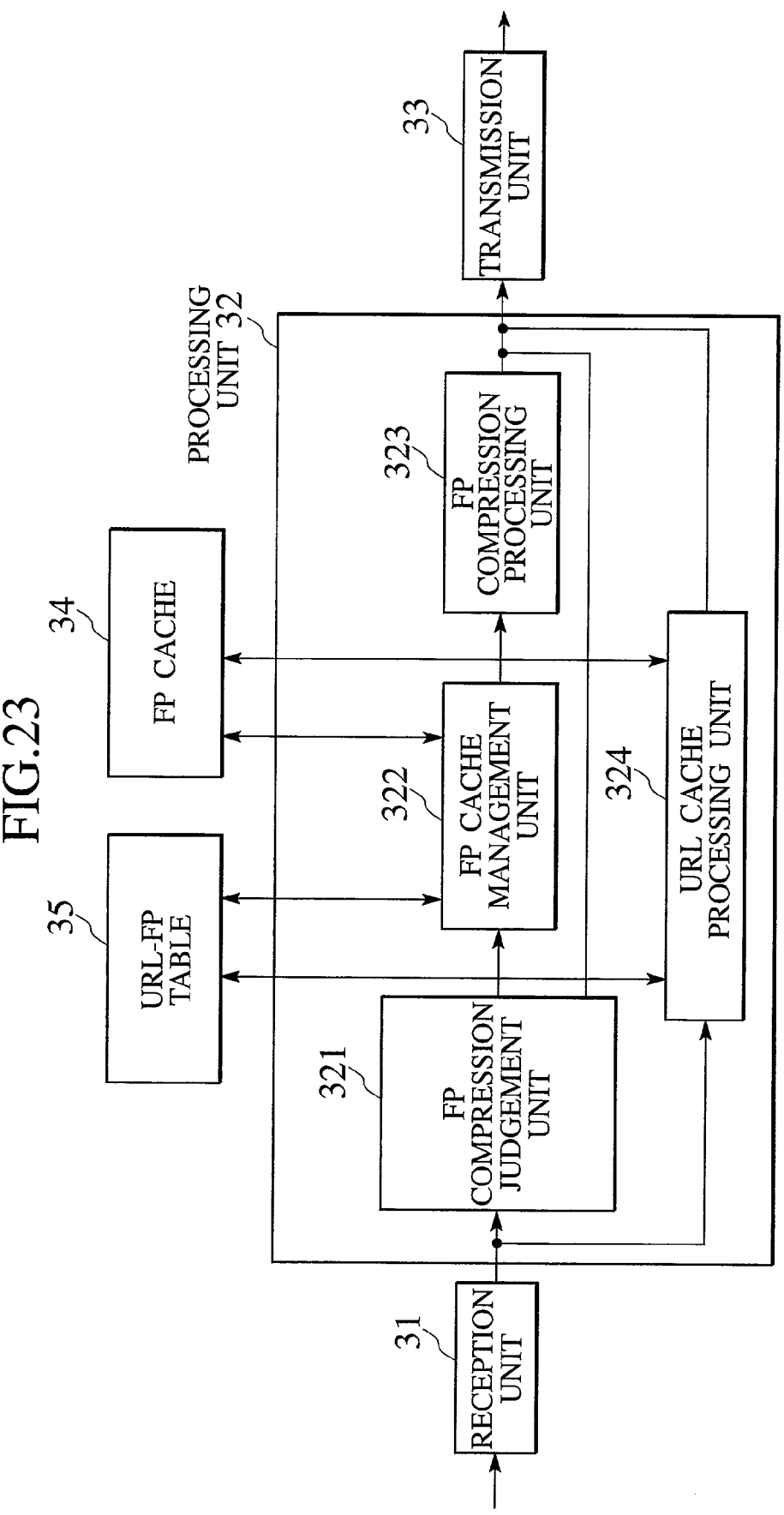
FIG. 23 is a block diagram showing another exemplary configuration of a server side proxy according to one embodiment of the present invention.

FIG. 23 shows an exemplary configuration of the server side proxy 30 in this case. This server side proxy 30 has a URL-FP table 35 for storing a correspondence between a URL that was accessed in the past and the fingerprint of its reply data, and a URL cache processing unit 324, in addition to the configuration of FIG. 11.

Figure 24:
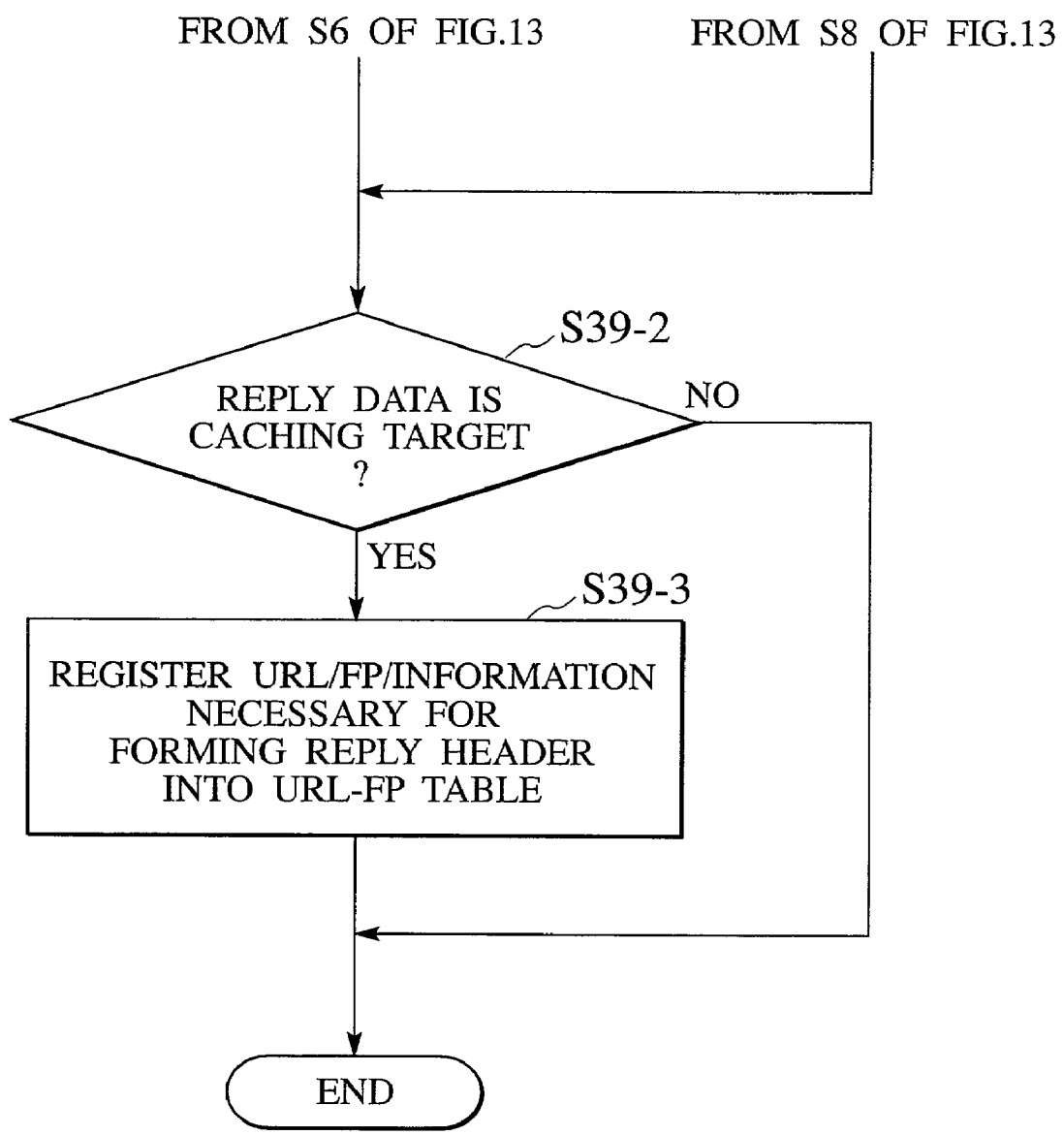
FIG. 24 is a flow chart showing one exemplary processing procedure of the server side proxy of FIG. 23 according to one embodiment of the present invention.

FIG. 24 shows an exemplary processing procedure of the server side proxy 30 at a time of transferring the reply message from the server side proxy 30 to the client side proxy 40.

Note that the processing procedure in this case is similar to that of FIG. 13 except that the steps S39-2 and S39-3 are added after the steps S6 and S8 of FIG. 13, and FIG. 24 only shows this part of the processing procedure which is to be added after the steps S6 and S8 of FIG. 13. Here, this part of the processing procedure to be added to that of FIG. 13 will be mainly described.

After transmitting the reply message to the client side proxy 40 from the transmission unit 33 (step S6 or S8), the server side proxy 30 checks and judges whether the reply data of this reply message is the caching target or not at the URL cache processing unit 324 (step S39-2). When it is judged as the caching target, the URL, the fingerprint, and the information necessary for forming the reply header are set in correspondence (the URL is set as a key) and registered into the URL-FP table 35 at the URL cache processing unit 324 (step S39-3). When it is judged as not a caching target, no further operation will be carried out.

Of course, this procedure can be modified in various ways similarly as that for the client side proxy 40 described above.

Figure 25:
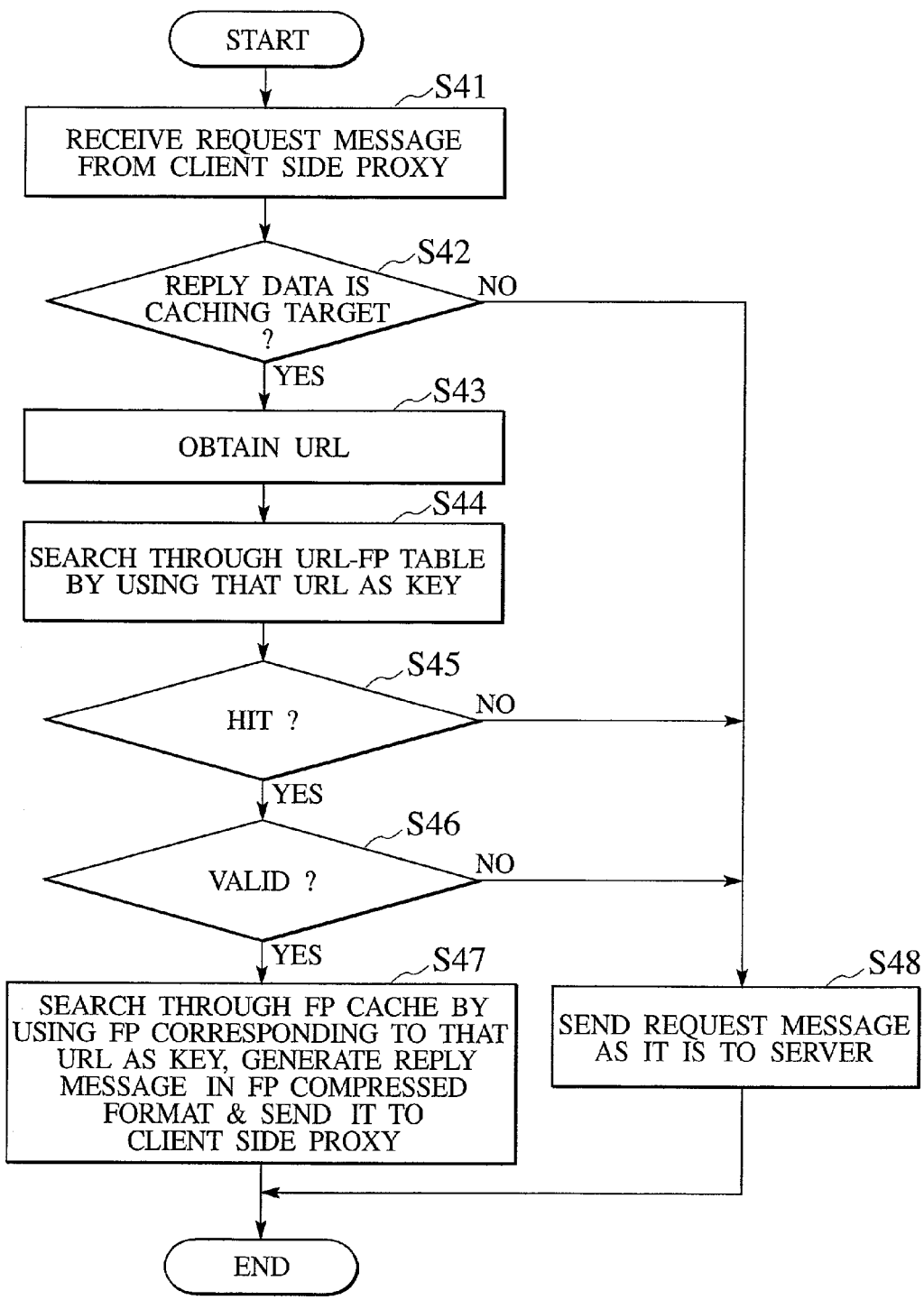
FIG. 25 is a flow chart showing another exemplary processing procedure of the server side proxy of FIG. 23 according to one embodiment of the present invention.

Next, FIG. 25 shows an exemplary processing procedure regarding the operation of the shared cache of the proxy server at the server side proxy 30 when the request message received from the client side proxy 40 is to be transferred from the server side proxy 30 to the server 20.

The processing procedure in this case is basically the same as the procedure of FIG. 21. Note that the step S37 of FIG. 21 produces the reply data and transfers this reply data to the client 50, whereas the step S47 of FIG. 25 corresponding to this operation produces the reply data in the FP compression format (of FIG. 8B, for example) and transfers this reply data to the client side proxy 40.

Such a configuration for carrying out the cache processing by providing the URL-FP table at the server side proxy as well is effective when one server side proxy is used from a plurality of client side proxies. Namely, when the cachable data that is requested from one client side proxy is already accessed by another client side proxy, it is cached at the server side proxy as well so that the processing can be completed by simply returning the cached data.

Note that the above description is directed to the case of providing the URL-FP table separately from the fingerprint cache, but it is also possible to form the URL-FP table and the fingerprint cache integrally.

Next, the operation in the case where the request data that is a source of the reply data to be transmitted by the server is transferred from the client side proxy 40 to the server side proxy 30 will be described.

Figure 40:
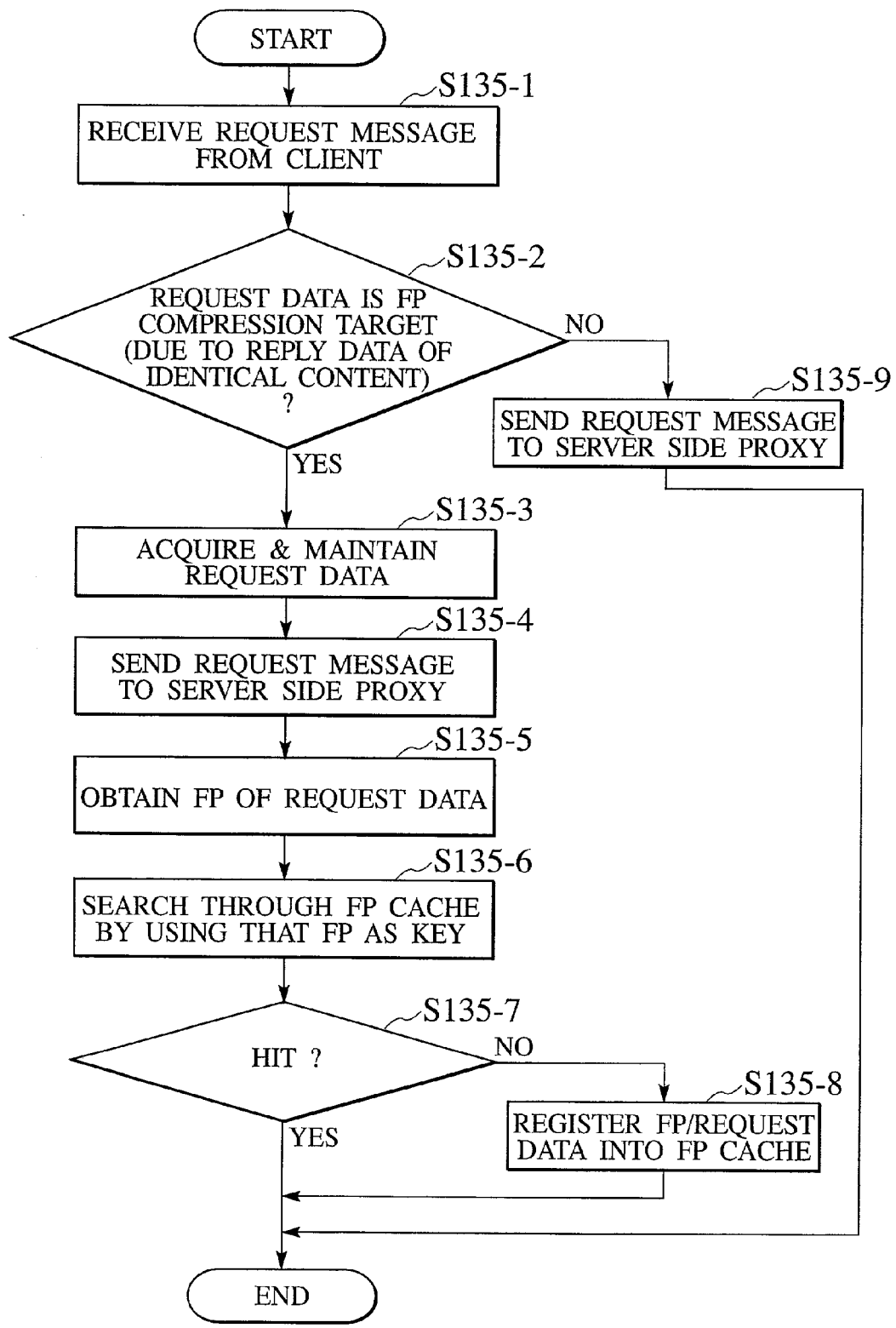
FIG. 40 is a flow chart showing another exemplary processing procedure of the client side proxy of FIG. 12 according to one embodiment of the present invention.

FIG. 40 shows an exemplary processing procedure of the client side proxy 40 at a time of receiving the request message from the client 50.

The procedure of FIG. 40 is similar to that of the server side proxy 30 shown in FIG. 13 as far as the fingerprint is concerned, but here it is assumed that the FP compression is not applied to the data transfer from the client side proxy 40 to the server side proxy 30, so that this procedure is different in that the request message is transferred by loading the request data even when the data with the same content as this request data is already registered in the fingerprint cache 44.

The client side proxy 40 receives the request message from the client 50 at the reception unit 41 (step S135-1).

The FP compression judgement unit 421 checks and judges whether the request data of the request message is a target for applying the FP compression or not (step S135-2). When the request data is judged as not a target for applying the FP compression (step S135-2 NO), the received request message is transferred to the server side proxy 30 from the transmission unit 43 (step S135-9).

When the request data of the request message is judged as a target for applying the FP compression at the step S135-2, the request data is acquired from this request message and maintained (step S135-3), and this request message is transferred to the server side proxy 30 from the transmission unit 43 (step S135-4).

Then, the fingerprint value of this request data is calculated at the FP cache management unit 422 (step S135-5), and the fingerprint cache 44 is searched through by using this fingerprint value as a key (step S135-6).

When a set of this fingerprint value and the corresponding data is not registered in the fingerprint cache 44 (step S135-7 NO), this fingerprint value and this request data are set in correspondence (the fingerprint value is set as a key) and registered into the fingerprint cache 44 at the FP cache management unit 422 (step S135-8).

On the other hand, when a set of this fingerprint value and the corresponding data is registered in the fingerprint cache 44 as a result of the search of the step S135-6 (step S135-7 YES), no further operation is carried out.

Note that the transmission of the step S135-4 can be carried out at a timing of the step S135-5 or any arbitrary timing after that. Also, the calculation of the fingerprint at the step S135-5 can be carried out at a timing of the step S135-4 or any arbitrary timing before that.

Figure 41:
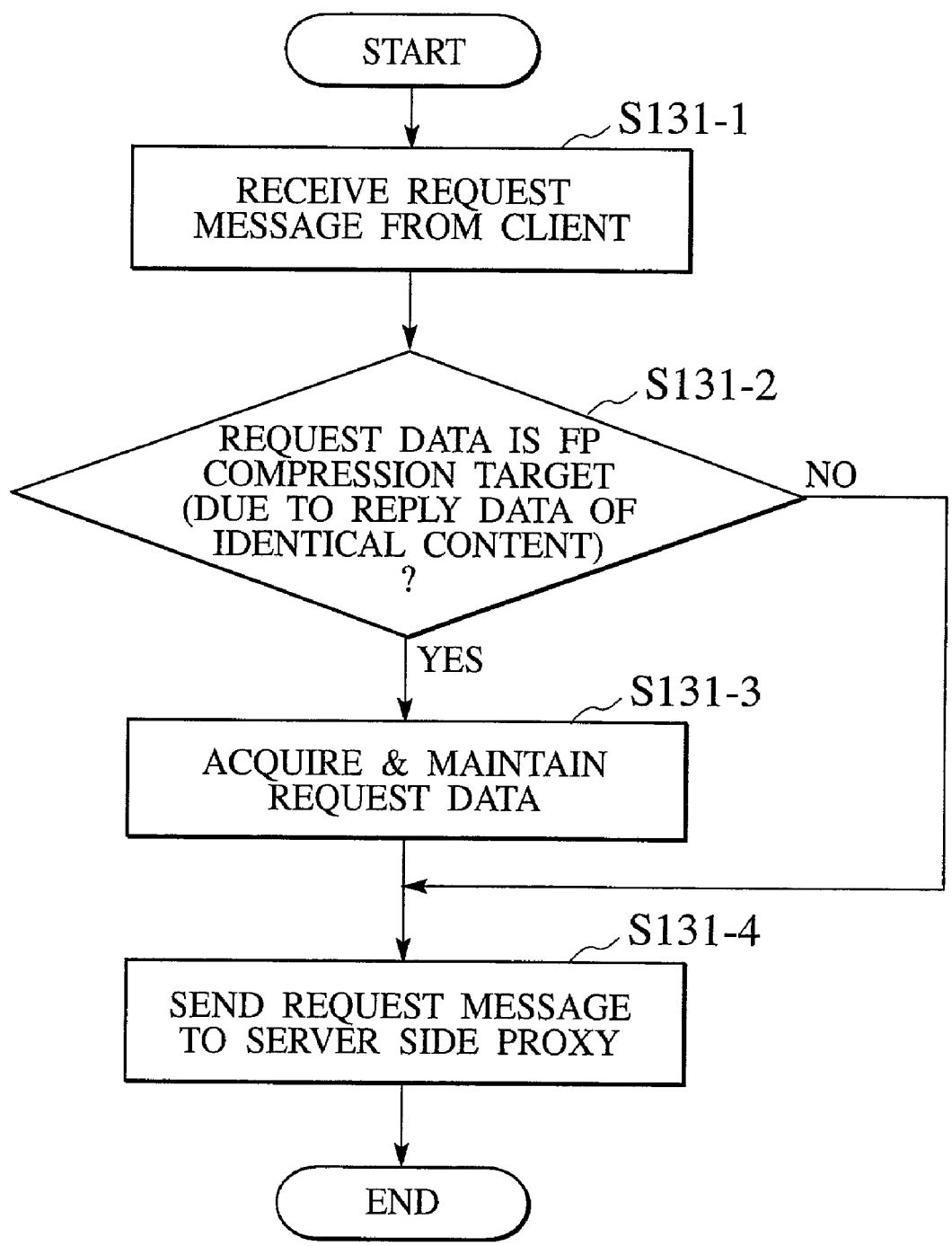
FIG. 41 is a flow chart showing another exemplary processing procedure of the client side proxy of FIG. 12 according to one embodiment of the present invention.
Figure 42:
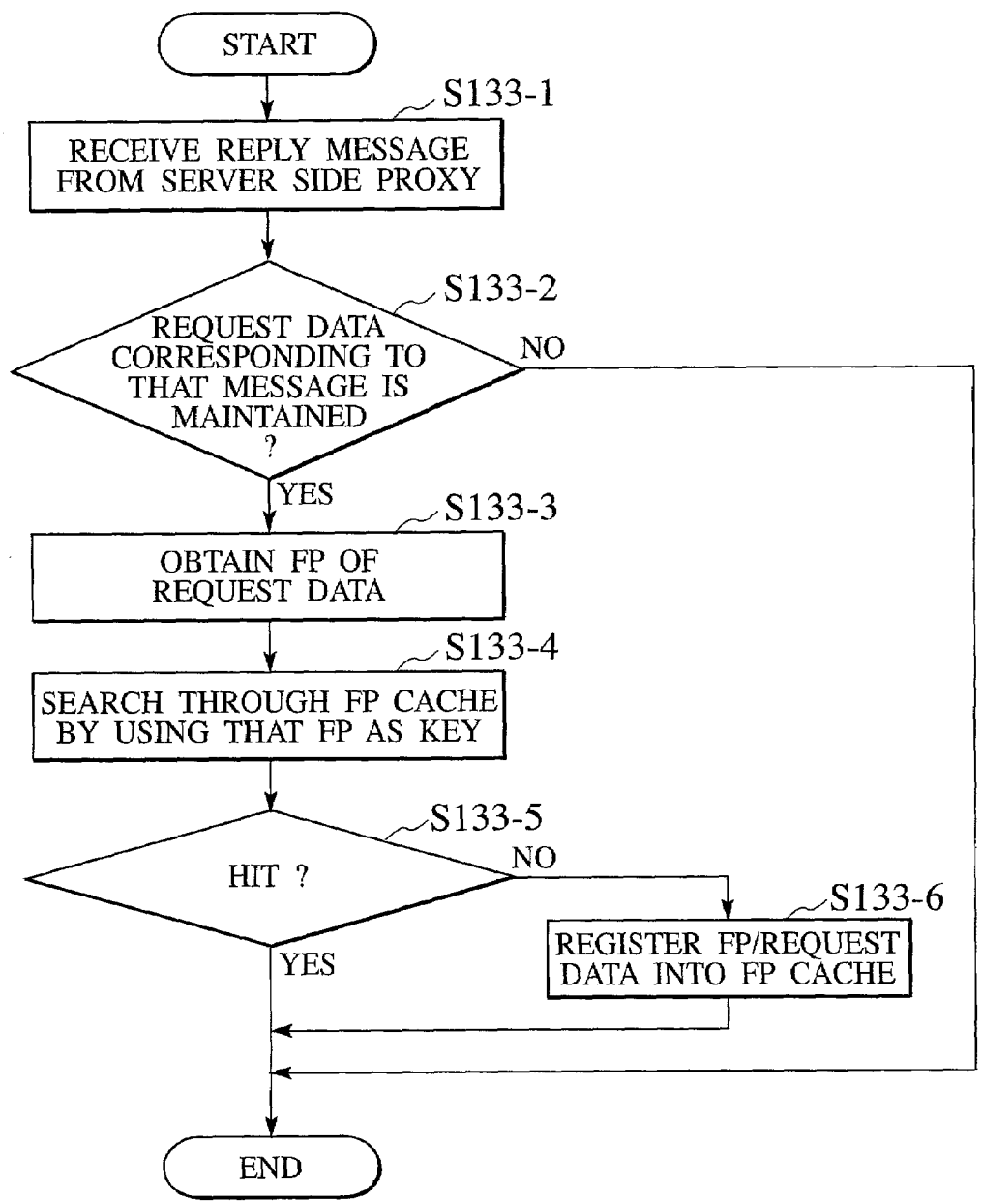
FIG. 42 is a flow chart showing another exemplary processing procedure of the client side proxy of FIG. 12 according to one embodiment of the present invention.

Next, FIG. 41 and FIG. 42 show another exemplary processing procedure of the client side proxy 40, which differs from the procedure of FIG. 40 in that, in the procedure of FIG. 40, the registration into the fingerprint cache is carried out at a timing of receiving the request message from the client 50, whereas in the procedure of FIG. 41 and FIG. 42, the registration into the fingerprint cache is carried out after receiving from the server side proxy 30 the reply message transmitted by the server 20 in response to the request message.

FIG. 41 shows a procedure at a time of receiving the request message from the client 50, and FIG. 42 shows a procedure at a time of receiving the reply message from the server side proxy 30. Note that the procedure of FIG. 42 is to be carried out along with the procedure of FIG. 14.

The client side proxy 40 receives the request message from the client 50 at the reception unit 41 (step S131-1).

The FP compression judgement unit 421 checks and judges whether the request data of the request message is a target for applying the FP compression or not (step S131-2). When the request data is judged as not a target for applying the FP compression (step S131-2 NO), the received request message is transferred to the server side proxy 30 from the transmission unit 43 (step S131-4).

When the request data of the request message is judged as a target for applying the FP compression at the step S131-2, the request data is acquired from this request message and maintained (step S131-3), and this request message is transferred to the server side proxy 30 from the transmission unit 43 (step S131-4).

On the other hand, the client side proxy 40 receives the reply message from the server side proxy 30 at the reception unit 41 (step S133-1).

Here, if the request data of the request message corresponding to the received reply message is not maintained (step S133-2 NO), no further operation regarding the request message registration processing is carried out.

If the request data of the request message corresponding to the received reply message is maintained (step S133-2 YES), the fingerprint value of this request data is calculated at the FP cache management unit 422 (step S133-3), and the fingerprint cache 44 is searched through by using this fingerprint value as a key (step S133-4).

When a set of this fingerprint value and the corresponding data is not registered in the fingerprint cache 44 (step S133-5 NO), this fingerprint value and this request data are set in correspondence (the fingerprint value is set as a key) and registered into the fingerprint cache 44 at the FP cache management unit 422 (step S133-6).

On the other hand, when a set of this fingerprint value and the corresponding data is registered in the fingerprint cache 44 as a result of the search of the step S133-4 (step S133-5 YES), no further operation is carried out.

Figure 43:
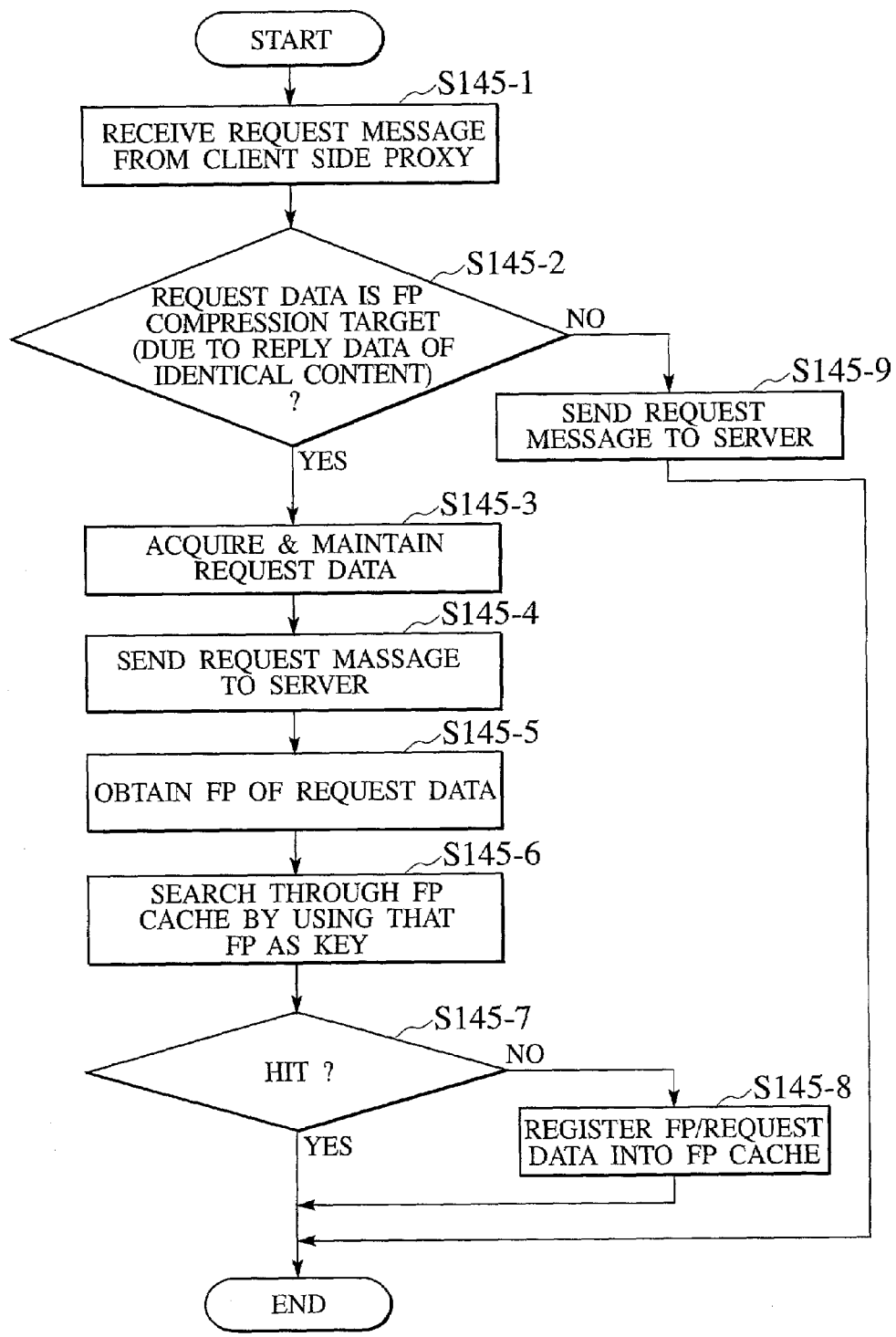
FIG. 43 is a flow chart showing another exemplary processing procedure of the server side proxy of FIG. 11 according to one embodiment of the present invention.

FIG. 43 shows an exemplary processing procedure of the server side proxy 30 at a time of receiving the request message from the client side proxy 40. The procedure of FIG. 43 is similar to that of the client side proxy 40 of FIG. 40.

The server side proxy 30 receives the request message from the client side proxy 40 at the reception unit 31 (step S145-1).

The FP compression judgement unit 321 checks and judges whether the request data of the request message is a target for applying the FP compression or not (step S145-2). When the request data is judged as not a target for applying the FP compression (step S145-2 NO), the received request message is transferred to the server 20 from the transmission unit 33 (step S145-9).

When the request data of the request message is judged as a target for applying the FP compression at the step S145-2, the request data is acquired from this request message and maintained (step S145-3), and this request message is transferred to the server 20 from the transmission unit 33 (step S145-4).

Then, the fingerprint value of this request data is calculated at the FP cache management unit 322 (step S145-5), and the fingerprint cache 34 is searched through by using this fingerprint value as a key (step S145-6).

When a set of this fingerprint value and the corresponding data is not registered in the fingerprint cache 34 (step S145-7 NO), this fingerprint value and this request data are set in correspondence (the fingerprint value is set as a key) and registered into the fingerprint cache 34 at the FP cache management unit 322 (step S145-8).

On the other hand, when a set of this fingerprint value and the corresponding data is registered in the fingerprint cache 34 as a result of the search of the step S145-6 (step S145-7 YES), no further operation is carried out.

Note that the transmission of the step S145-4 can be carried out at a timing of the step S145-5 or any arbitrary timing after that. Also, the calculation of the fingerprint at the step S145-5 can be carried out at a timing of the step S145-4 or any arbitrary timing before that.

Figure 44:
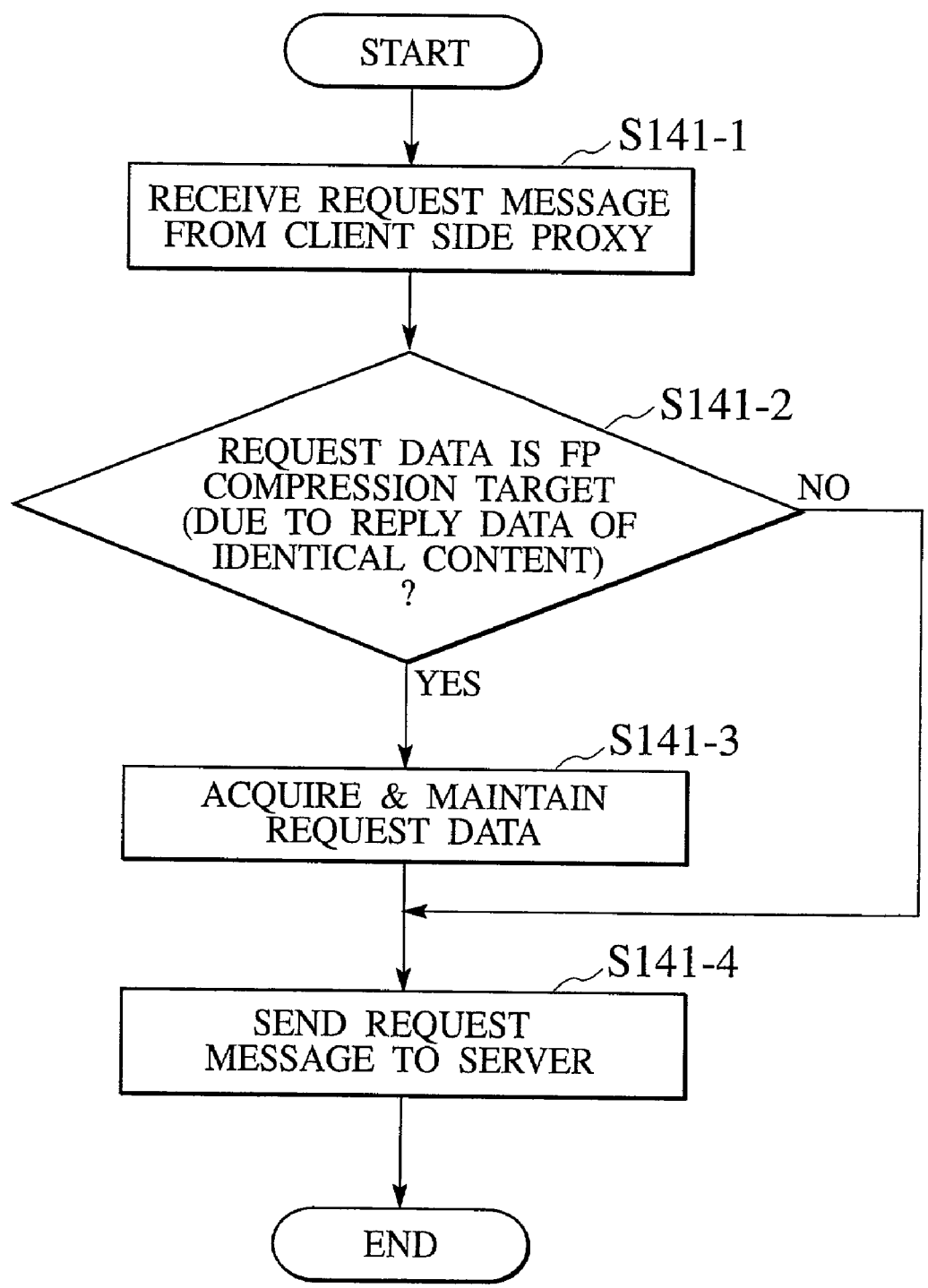
FIG. 44 is a flow chart showing another exemplary processing procedure of the server side proxy of FIG. 11 according to one embodiment of the present invention.

Next, FIG. 44 and FIG. 45 show another exemplary processing procedure of the server side proxy 30. The procedure of FIG. 44 and FIG. 45 is similar to that of the client side proxy 40 of FIG. 41 and FIG. 42, in that the registration into the fingerprint cache is carried out after receiving the reply message from the server 20.

FIG. 44 shows a procedure at a time of receiving the request message from the client side proxy 40, and FIG. 45 shows a procedure at a time of receiving the reply message from the server 20. Note that the procedure of FIG. 45 is to be carried out along with the procedure of FIG. 13.

The server side proxy 30 receives the request message from the client side proxy 40 at the reception unit 31 (step S141-1).

The FP compression judgement unit 321 checks and judges whether the request data of the request message is a target for applying the FP compression or not (step S141-2). When the request data is judged as not a target for applying the FP compression (step S141-2 NO), the received request message is transferred to the server 20 from the transmission unit 33 (step S141-4).

When the request data of the request message is judged as a target for applying the FP compression at the step S141-2, the request data is acquired from this request message and maintained (step S141-3), and this request message is transferred to the server 20 from the transmission unit 33 (step S141-4).

On the other hand, the server side proxy 30 receives the reply message from the server 20 at the reception unit 31 (step S143-1).

Here, if the request data of the request message corresponding to the received reply message is not maintained (step S143-2 NO), no further operation regarding the request message registration processing is carried out.

If the request data of the request message corresponding to the received reply message is maintained (step S143-2 YES), the fingerprint value of this request data is calculated at the FP cache management unit 322 (step S143-3), and the fingerprint cache 34 is searched through by using this fingerprint value as a key (step S143-4).

When a set of this fingerprint value and the corresponding data is not registered in the fingerprint cache 34 (step S143-5 NO), this fingerprint value and this request data are set in correspondence (the fingerprint value is set as a key) and registered into the fingerprint cache 34 at the FP cache management unit 322 (step S143-6).

On the other hand, when a set of this fingerprint value and the corresponding data is registered in the fingerprint cache 34 as a result of the search of the step S143-4 (step S133-5 YES), no further operation is carried out.

Note that, in the series of processings, it is possible for the client side proxy 40 and the server side proxy 30 to calculate the fingerprint of the target data independently. It is also possible for the server side proxy 30 to calculate the fingerprint and notify the calculated fingerprint to the client side proxy 40 such that the client side proxy 40 uses the notified fingerprint. It is also possible for the client side proxy 40 to calculate the fingerprint and notify the calculated fingerprint to the server side proxy 30 such that the server side proxy 30 uses the notified fingerprint.

In the following, with reference to FIG. 46, the operation in the case of carrying out the registration into the fingerprint cache when the request data that is a source of the reply data to be transmitted by the server is transferred from the client side proxy 40 to the server side proxy 30 will be described in further detail.

Note that FIG. 46 shows a concrete example regarding the procedure of the client side proxy 40 of FIG. 41 and FIG. 42 and the procedure of the server side proxy 30 of FIG. 44 and FIG. 45.

(1) Suppose that the browser or the like on the client 50 issued the request message of the PUT method to the server 20 by using the URL of "/D.doc", for example. Here, the data desired to be sent to the server 20 (which is assumed to be "document D" in the example of FIG. 46) is loaded in the request body. Also, the browser or the like is set in advance to send the request message for the server 20 to the client side proxy 40 first.

(2) The client side proxy 40 that received the request message from the client 50 transfers this request message to the server side proxy 30. At this point, this request data is maintained.

(3) The server side proxy 30 that received the request message transfers this request message to the server 20. At this point, this request data is maintained.

(4) The server 20 carries out a processing with respect to this request message, and then returns the reply message to the server side proxy 30.

(5) The server side proxy 30 that received the reply message calculates the fingerprint of the request data of the request message corresponding to the received reply message, and checks whether the data having this fingerprint name exists in the fingerprint cache 34 or not. If it does not exist, it is the first time data so that this data is registered into the fingerprint cache 34 by using the fingerprint as its name.

(6) The server side proxy 30 transfers the reply message to the client side proxy 40.

Note that, as described above, when the reply message that contains the fingerprint value calculated from the request data in the reply header or the like is sent, it is possible to omit a task for calculating the fingerprint again at the client side proxy 40.

(7) The client side proxy 40 that received the reply message registers the request data into the fingerprint cache 44.

Note that, as described above, either the fingerprint is calculated from the request data or the fingerprint that is entered into the reply header or the like by the server side proxy 30 is taken out and this fingerprint is registered as a name.

(8) The client side proxy 40 returns the reply message to (the browser or the like operating on) the client 50 (after deleting an information to be used only between the server side proxy 30 and the client side proxy 40 such as the fingerprint value in the case of a configuration in which such an information exists in the reply header or the like).

Note that, in the above described operation, the fingerprint cache registration of the above described (5) can be carried out at arbitrary timing after the above described (2) for receiving the request data. Also, the fingerprint cache registration of the above described (7) can be carried out after or in parallel to the operation of the above described (8) for returning the reply data.

The request data registered in the fingerprint cache in this way can be used for the replacement of the subsequent reply data so as to reduce the network traffic.

Now, in the examples described so far, at a time of transferring the reply data from the server side proxy 30 to the client side proxy 40, if this reply data is the same as that registered in the fingerprint cache, the network traffic is reduced by transferring the corresponding fingerprint instead of this reply data. This FP compression can be applied also to the case of transferring the request data from the client side proxy 40 to the server side proxy 30 as well. Note that it is also possible to apply the FP compression only to the case of transferring the request data from the client side proxy 40 to the server side proxy 30.

Also, in any of the case for applying the FP compression only to the request data transfer, the case for applying the FP compression only to the reply data transfer, and the case for applying the FP compression to both the request data transfer and the reply data transfer, a configuration regarding the shared cache for the reply data corresponding to the URL specified by the request message can be provided in the client side proxy 40 alone or the server side proxy 30 alone, or in both proxies.

In the case of applying the FP compression to the request data transfer from the client side proxy 40 to the server side proxy 30, the roles of the server side proxy 30 and the client side proxy 40 with respect to the reply data described above should be interchanged, so that in the case of applying the FP compression to both the request data transfer and the reply data transfer, the server side proxy 30 should have a fingerprint decompression processing unit in the processing unit 32 in addition to the configuration of FIG. 11, and the client side proxy 40 should have a fingerprint compression processing unit in the processing unit 42 in addition to the configuration of FIG. 12.

Note that, in either proxy, the fingerprint compression processing unit and the fingerprint decompression processing unit can be combined into a fingerprint compression/decompression processing unit.

Also, in the server side proxy 30 and/or the client side proxy 40, it is possible to provide the fingerprint cache for the request data transfer independently from the fingerprint cache for the reply data transfer, and it is also possible to share the same fingerprint cache among the reply data transfer and the request data transfer.

Figure 26:
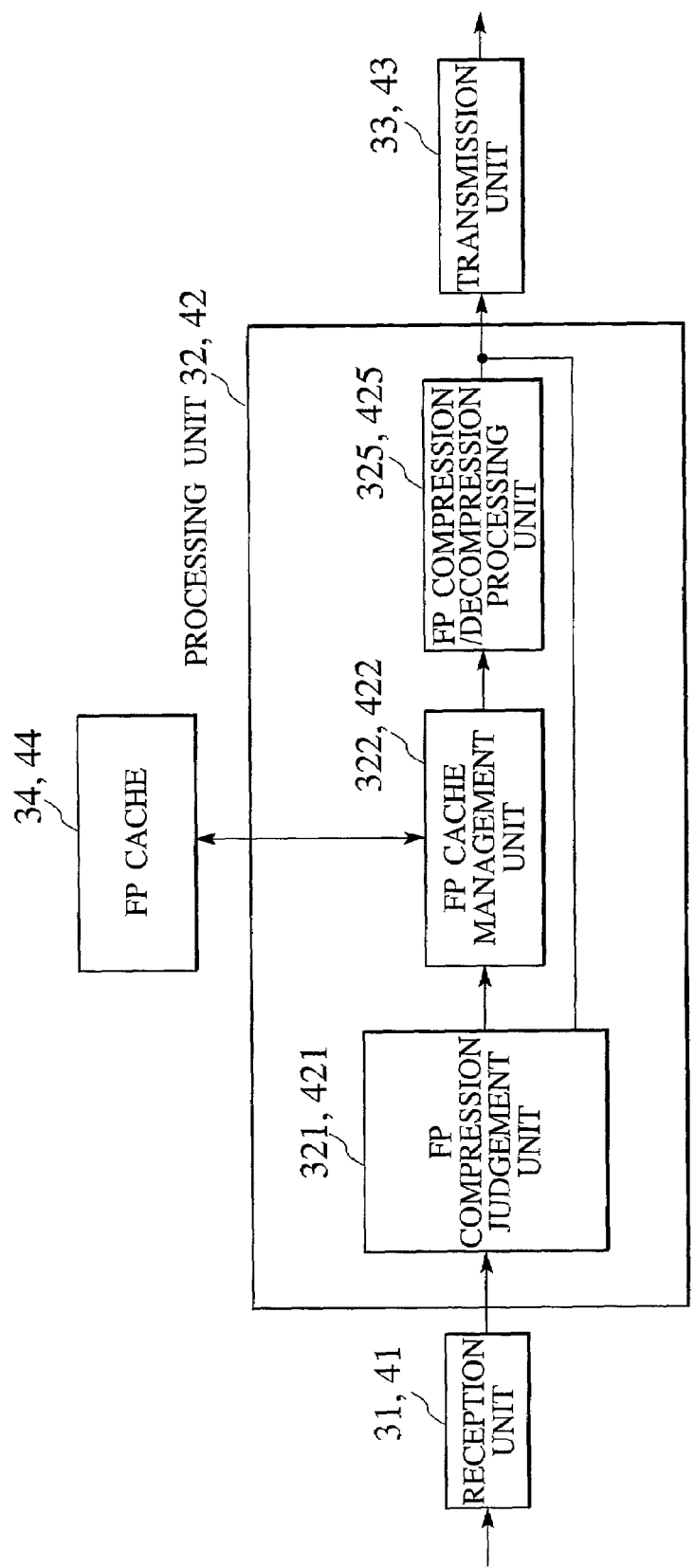
FIG. 26 is a block diagram showing another exemplary configuration of a server side or client side proxy according to one embodiment of the present invention.

FIG. 26 shows an exemplary configuration of the proxy (which can be either one of the server side proxy and the client side proxy) in this case.

Figure 27:
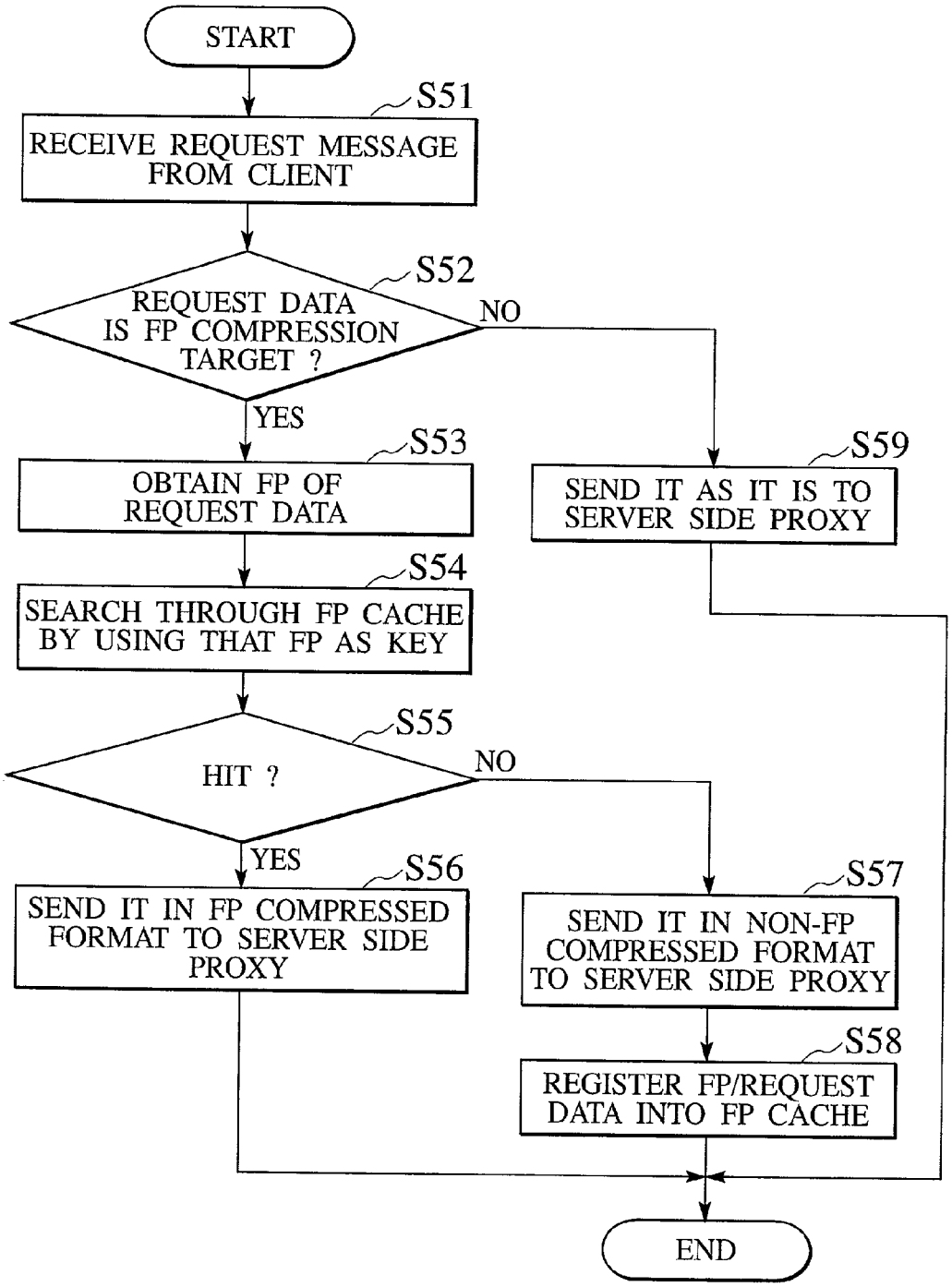
FIG. 27 is a flow chart showing one exemplary processing procedure of the client side proxy of FIG. 26 according to one embodiment of the present invention.

Also, FIG. 27 shows an exemplary processing procedure of the client side proxy 40 at a time of transferring the request message from the client side proxy 40 to the server side proxy 30. Note that, in this case, the procedure of FIG. 40 or the procedure of FIG. 41 and 42 described above are unnecessary.

The client side proxy 40 receives the request data from the client 50 at the reception unit 41 (step S51).

The FP compression judgement unit 421 checks and judges whether the request data of the request message is a target for applying the FP compression or not (step S52).

When the request data is judged as not a target for applying the FP compression (step S52 NO), the received request message is transferred to the server side proxy 30 from the transmission unit 43 (step S59).

When the request data of the request message is judged as a target for applying the FP compression at the step S52, the fingerprint value of this request data is calculated at the FP cache management unit 422 (step S53), and the fingerprint cache 44 is searched through by using this fingerprint value as a key (step S54).

When a set of this fingerprint value and the corresponding data is registered in the fingerprint cache 44 (step S55 YES), the received request message is converted into the FP compression format (of FIG. 8B, for example) by using this fingerprint value at the FP compression/decompression processing unit 425, and transmitted to the server side proxy 30 from the transmission unit 43 (step S56).

On the other hand, when a set of this fingerprint value and the corresponding data is not registered in the fingerprint cache 44 as a result of the search of the step S54 (step S55 NO), the following two operations are carried out.

(1) The received request message is converted into a non-FP compression format (of FIG. 8A, for example) (by using this fingerprint value according to the need) at the FP compression/decompression processing unit 425, and transmitted to the server side proxy 30 from the transmission unit 43 (step S57).

(2) This fingerprint value and this request data are set in correspondence (the fingerprint value is set as a key) and registered into the fingerprint cache 44 at the FP cache management unit 422 (step S58).

Note that these operations (1) and (2) can be carried out in any desired order or in parallel.

Figure 28:
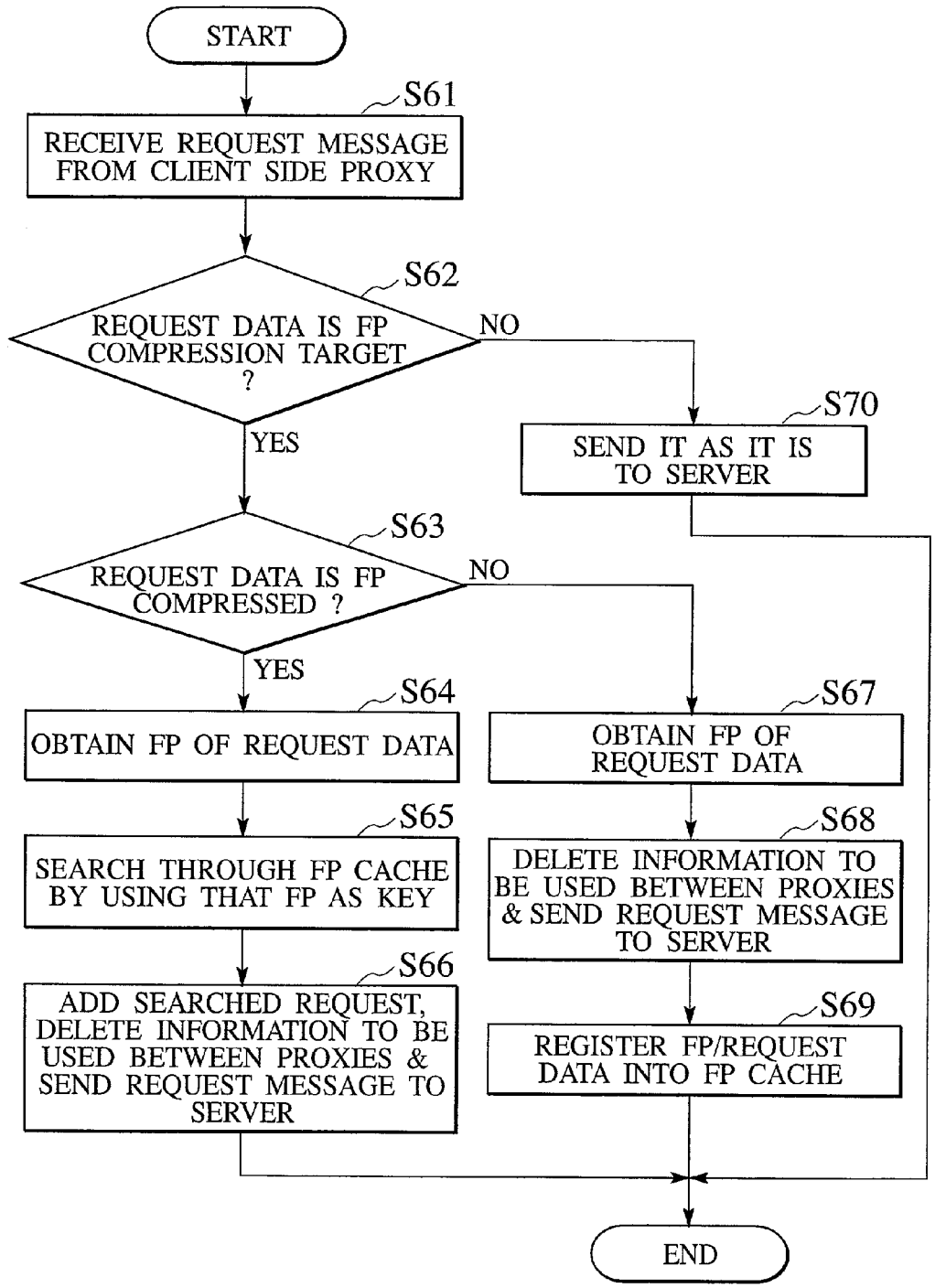
FIG. 28 is a flow chart showing one exemplary processing procedure of the server side proxy of FIG. 26 according to one embodiment of the present invention.

Next, FIG. 28 shows an exemplary processing procedure of the server side proxy 30 at a time of transferring the request message from the client side proxy 40 to the server side proxy 30. Note that, in this case, the procedure of FIG. 43 or the procedure of FIG. 44 and 45 described above are unnecessary.

The server side proxy 30 receives the request message from the client side proxy 40 at the reception unit 31 (step S61).

The FP compression judgement unit 321 checks and judges whether the request data of this request message is a target for applying the FP compression or not (step S62). When the request data is judged as not a target for applying the FP compression (step S62 NO), the received request message is transferred to the server 20 from the transmission unit 33 (step S70).

When the request data of this request message is judged as a target for applying the FP compression at the step S62, the FP compression judgement unit 321 also checks and judges whether the request data is FP compressed or not (step S63).

When the request data of this request message is judged as FP compressed (as shown in FIG. 8B, for example) at the step S63, the fingerprint value of this request data is obtained at the FP cache management unit 322 (step S64), and the fingerprint cache 34 is searched through by using this fingerprint value as a key (step S65).

Then, the data corresponding to this fingerprint value obtained from the fingerprint cache 34 is attached to the received request message and a special information to be used between the proxies is deleted in the case of using such an information at the FP compression/decompression processing unit 325, and the resulting request message is transmitted to the server 20 from the transmission unit 33 (step S66).

On the other hand, when the request of this request message is judged as not FP compressed (as shown in FIG. 8A, for example) at the step S63, the following two operations are carried out.

(1) The special information to be used between the proxies is deleted from the received request message in the case of using such an information at the FP compression/decompression processing unit 325, and the resulting request message is transmitted to the server 20 from the transmission unit 33 (step S68).

(2) The fingerprint value of this request data is obtained (step S67), and this fingerprint value and this request data are set in correspondence (the fingerprint value is set as a key) and registered into the fingerprint cache 34 at the FP cache management unit 322 (step S69).

Note that these operations (1) and (2) can be carried out in any desired order or in parallel.

Similarly as described above, the step S67 can use a method for obtaining the fingerprint from the message when the fingerprint is described in the message or a method for calculating the fingerprint value by using the hash function or the like from the request data when the fingerprint is not described in the message. It is also possible to use a method for calculating the fingerprint value from the request data even when the fingerprint is described in the message.

Note also that it is possible to carry out the step S64 or the step S67 between the step S62 and the step S63, and it is also possible to carry out the step S57 between the step S68 and the step S69. Note also that the judgement of the step S62 and the judgement of the step S63 can be made simultaneously.

In the case where even the request data is to be replaced with the fingerprint in this way, at a time of uploading the same file to the server many times, for example, it suffices to send the fingerprint in the second and subsequent times so that the network traffic can be reduced.

Figure 29:
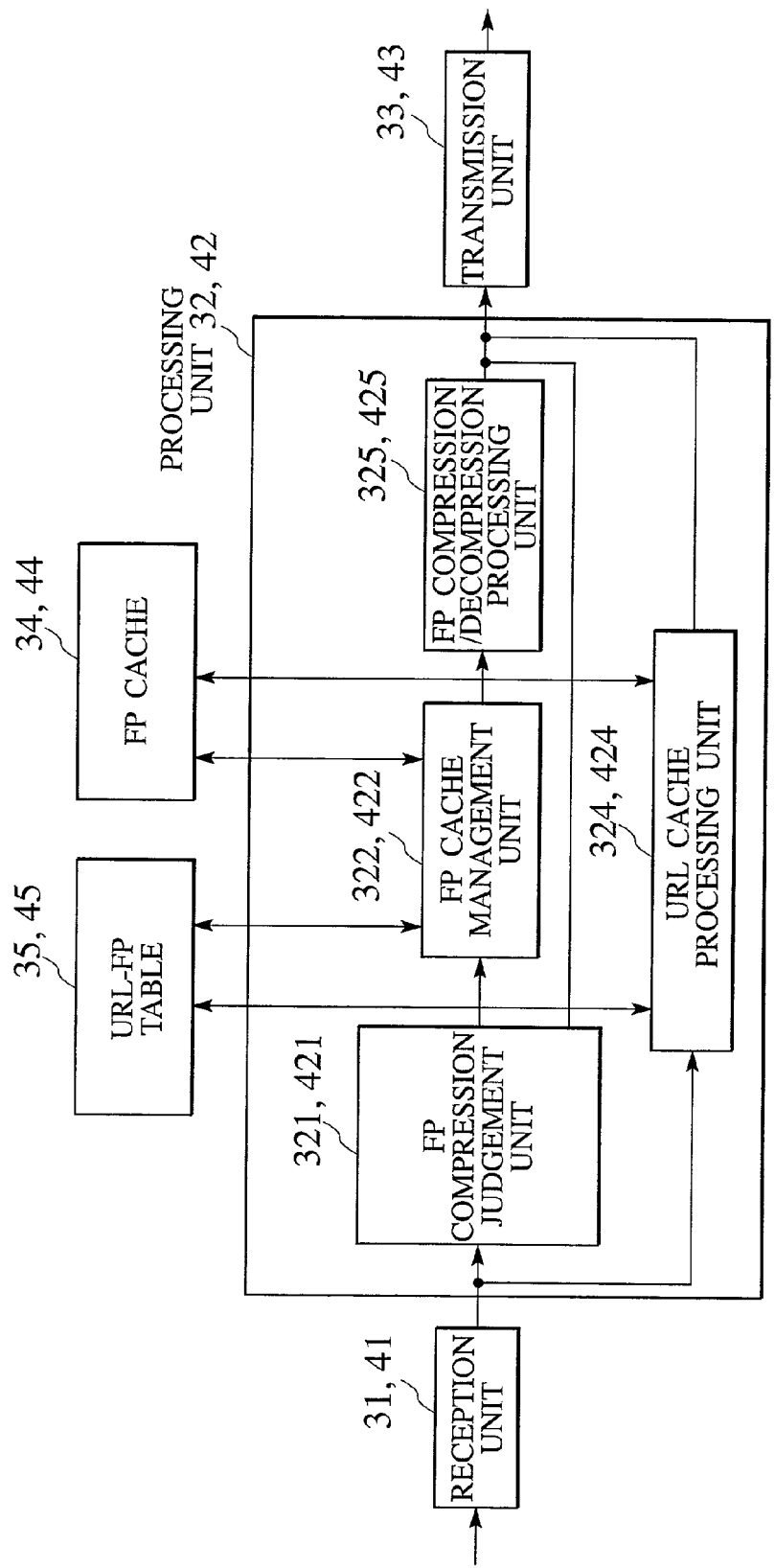
FIG. 29 is a block diagram showing another exemplary configuration of a server side or client side proxy according to one embodiment of the present invention.

Of course, in this case, a configuration regarding the shared cache for the reply data corresponding to the URL specified by the request message transmitted from the client as described above can be provided in the server side proxy 30 and/or the client side proxy 40. FIG. 29 shows an exemplary configuration of the proxy (which can be either one of the server side proxy and the client side proxy) in this case. The operations of the server side proxy 30 and the client side proxy 40 in this case are the same as those described above.

Note that, in this embodiment, the cases of handling the request message to be transferred from the client side proxy to the server side proxy or the reply message to be transferred from the server side proxy to the client side proxy have been described, but in the case where one proxy is connected with both a device for transmitting the request message and a device for transmitting the reply message, or with a device for transmitting both the request message and the reply message, it is of course possible to handle the request message and the reply message to be transferred from the client side proxy to the server side proxy as well as the request message and the reply message to be transferred from the server side proxy to the client side proxy. It is also possible to handle only the request message to be transferred from the client side proxy to the server side proxy and the request message to be transferred from the server side proxy to the client side proxy, for example.

Figure 30:
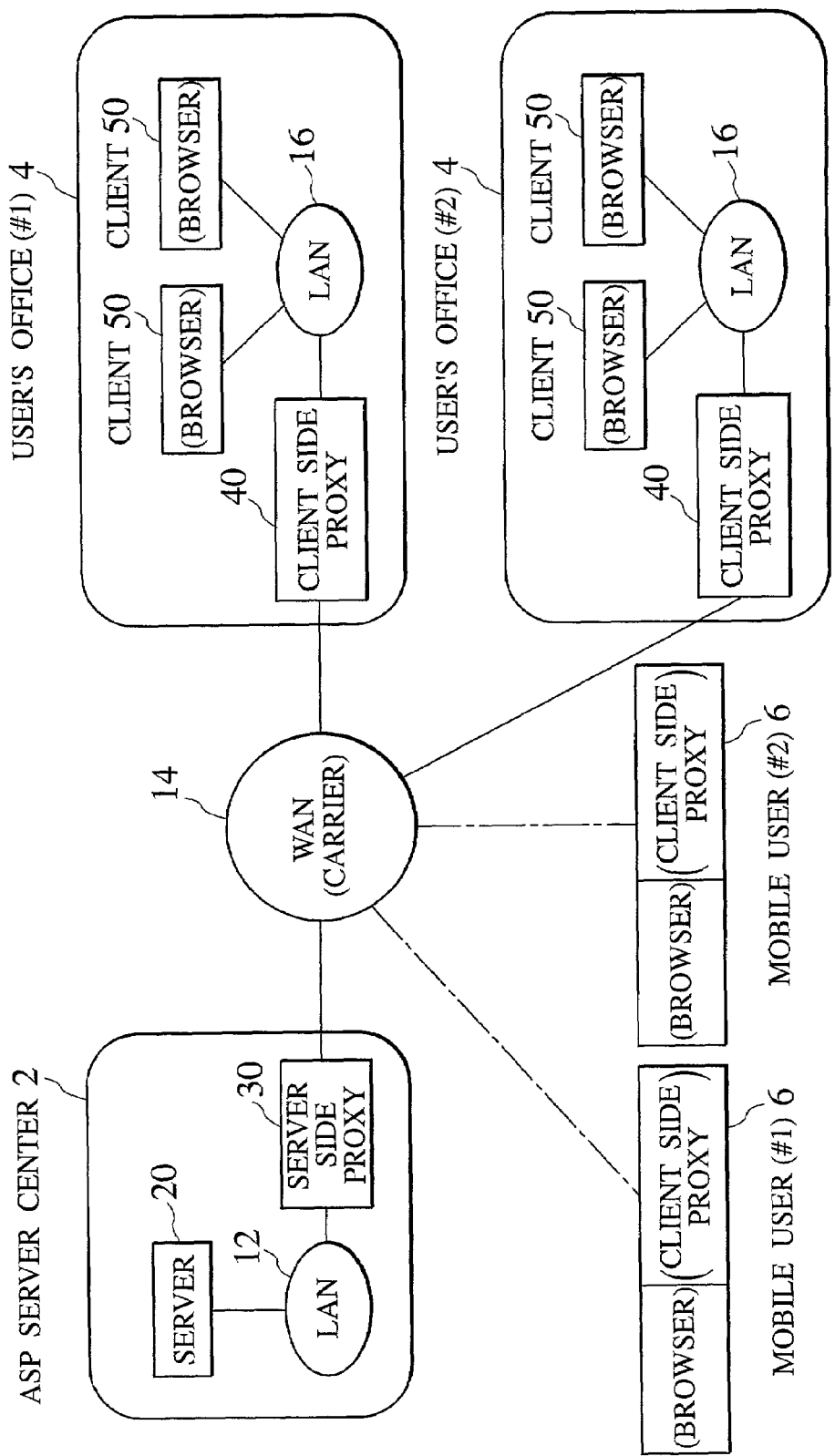
FIG. 30 is a diagram showing another exemplary configuration of a computer network system according to one embodiment of the present invention.

Now, up to this point, the embodiment using one-to-one communications between one server side proxy and one client side proxy has been described, but the present invention is not limited to a system using one-to-one communications between the server side proxy and the client side proxy and also applicable to a system using one-to-multiple communications between the server side proxy and the client side proxies, a system using multiple-to-one communications between the server side proxies and the client side proxy, and a system using multiple-to-multiple communications between the server side proxies and the client side proxies. For example, as shown in FIG. 30, the client side proxies provided at a plurality of user's offices and/or the personal proxies utilized by the mobile users can share the server side proxy.

Also, up to this point, the embodiment in which the entire data contained in one message is a target for applying the FP compression (a target for the registration into the fingerprint cache) has been described, but in the case where the data contained in one message is formed by a set of prescribed unit data, for example, it is also possible to set only a part of the unit data contained in one message as a target for applying the FP compression (a target for the registration into the fingerprint cache).

For example, in FIG. 46, the entire request data contained in the request message of the PUT method is a target for the registration into the fingerprint cache. However, on the Web, a plurality of data are often bundled together into one data and exchanged over the network by the scheme called MIME encoding, for example. For this reason, in the case where the request data contains a plurality of data bundled together by the MIME encoding, the entire request data and all the individual data obtained by decoding the MIME encoding, or only those data that are selected from them according to a prescribed selection criterion, can be set as a target for applying the FP compression. In this case, it is possible to obtain the fingerprint for each individual data and register each individual data into the fingerprint cache by using the fingerprint as a name.

As a criterion for selecting the data to be registered into the fingerprint cache from the entire request data and all the individual data obtained by decoding the MIME encoding, any of the following criteria or their combinations can be used, for example.

data with a size larger than a prescribed size data of a prescribed type

The selection of the data to be registered into the fingerprint cache can be realized by providing the same criterion at both the server side proxy and the client side proxy such that each proxy judges and registers the appropriate data, for example. It is also possible for the server side proxy to return an information indicating the selected data (that contains a set of the order of each selected data in a sequence of a plurality of MIME encoded data and its fingerprint value as many as necessary) in the reply header or the like, such that the client side proxy registers the specified data into the fingerprint cache according to that information, for example. Also, when the fingerprint values of those data that are registered into the fingerprint cache at the server side proxy are entered in the reply header or the like and sent to the client side server, it is possible to omit a task for calculating the fingerprint at the client side proxy.

Of course, the scheme for decoding the MIME encoded data into individual data and register them into the fingerprint cache as described here is applicable not only to the request data but also to the reply data.

As described, according to the present invention, correspondences between data and their names are registered at the data transfer devices and the corresponding names are transferred, instead of transferring the data, for those data for which the correspondences are registered, so that it is possible to reduce the amount of transfer data among the data transfer devices.

For example, even when the reply message of the GET method is a private data, it is possible to compress this message by using the fingerprint and transfer it between the data transfer devices. Also, for example, even when the reply message of the GET method is a dynamic data, it is possible to compress this message by using the fingerprint and transfer it between the data transfer devices as long as the content of the data is the same. Also, for example, even in the case of using the POST method, it is possible to compress the data by using the fingerprint and transfer it between the data transfer device as long as the resulting data is the same.

Also, for example, by registering the data written by the PUT method into the fingerprint cache, when this data is to be read out as a result of the GET method or the POST method, it is possible to compress this data by using the fingerprint and transfer it between the data transfer devices.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the server side proxy and the client side proxy of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that the fingerprint used in the above described embodiments can be replaced by the fingerprint calculated as described above plus some additional information.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data transfer device for receiving first data transmitted from a first communication device, transmitting the first data to another data transfer device connected to a second communication device that is a destination of the first data, receiving second data transmitted from the second communication device from the another data transfer device, and transmitting the second data to the first communication device that is a destination of the second data, the data transfer device comprising:

a reception unit configured to receive the first data from the first communication device;

a cache unit configured to register cache data that were transmitted to the another data transfer device in past, in correspondence to cache data names each of which is generated according to a content of each cache data and assigned to each cache data;

a processing unit configured to carry out a processing for transmitting a first data name that is generated according to a content of the first data and assigned to the first data, instead of transmitting the first data, when the first data name is registered in the cache unit, or a processing for registering the first data in correspondence to the first data name into the cache unit and transmitting the first data when the first data name is not registered in the cache unit, upon receiving the first data transmitted from the first communication device; and a transmission unit configured to transmit the first data name or the first data to the another data transfer device according to a processing carried out by the processing unit.

2. The data transfer device of claim 1, wherein the cache unit registers the cache data names each of which is a value obtained by compressing each cache data by a prescribed method, and the processing unit transmits or registers the first data name which is a value obtained by compressing the first data by the prescribed method.

3. The data transfer device of claim 1, wherein the cache unit registers the cache data names each of which is a value obtained by applying a prescribed hash function to each cache data, and the processing unit transmits or registers the first data name which is a value obtained by applying the prescribed hash function to the first data.

4. The data transfer device of claim 1, wherein the processing unit also transmits the first data name to be assigned to the first name at a time of transmitting the first data to the another data transfer device as the first data name is not registered in the cache unit.

5. The data transfer device of claim 1, wherein the processing unit transmits the first data name and registers the first data into the cache unit at least with respect to a data of a reply message which is not null.

6. The data transfer device of claim 1, wherein the processing unit excludes data that satisfy a prescribed condition from targets for carrying out a registration into the cache unit.

7. The data transfer device of claim 1, wherein the data transfer device is connected to the first communication device through a local area network.

8. The data transfer device of claim 1, wherein the data transfer device is provided in a form of a software implemented on the first communication device.

9. The data transfer device of claim 1, wherein when the processing unit registers the first data received from the first communication device into the cache unit and the first data is a data of a reply message corresponding to a request message from the second communication device to the first communication device, the processing unit also registers a URL for requested data of the request message corresponding to the reply message in correspondence to the first data name into the cache unit or another cache unit; and when the request message transmitted by the second communication device is received from the another data transfer device and the URL for the requested data of the request message is registered in the cache unit or the another cache unit, the processing unit also produces the reply message corresponding to the request message and destined to the second communication device according to the requested data registered in the cache unit or the another cache unit in correspondence to the first data name corresponding to the URL, and transmits the reply message to the another data transfer device.

10. The data transfer device of claim 9, wherein the reception unit receives the request message of a GET method.

11. The data transfer device of claim 1, wherein the data transfer device is connected to the first communication device which is a server device, while the another data transfer device is connected to the second communication device which is a client device.

12. The data transfer device of claim 1, wherein at a time of transmitting the second data received from the another data transfer device to the first communication device, the processing unit also carries out a processing for registering the second data in correspondence to a second data name that is generated according to a content of the second data and assigned to the second data into the cache unit, when the second data name is not registered in the cache unit.

13. The data transfer device of claim 12, wherein when the second data is a data of a request message, the processing unit registers the second data into the cache unit upon receiving a reply message corresponding to the request message.

14. The data transfer device of claim 12, wherein when the second data is a data of a request message, the processing unit registers the second data into the cache unit before receiving a reply message corresponding to the request message.

15. The data transfer device of claim 12, wherein when the second data is formed by a plurality of unit data, the processing unit registers each one of all the unit data or a part of the unit data that satisfy a prescribed condition into the cache unit in correspondence to each unit data name that is generated according to a content of each unit data and assigned to each unit data.

16. The data transfer device of claim 15, wherein the second data is applied with a MIME encoding, and the processing unit obtains the unit data by decoding the MIME encoding.

17. A data transfer device for receiving first data transmitted from a first communication device through another data transfer device, transmitting the first data to a second communication device that is a destination of the first data, receiving second data transmitted from the second communication device, and transmitting the second data to the another data transfer device connected to the first communication device that is a destination of the second data, the data transfer device comprising:

a reception unit configured to receive the first data or a first data name that is generated according to a content of the first data and assigned to the first data, from the another data transfer device;

a cache unit configured to register cache data that were received from the another data transfer device in past, in correspondence to cache data names each of which is generated according to a content of each cache data and assigned to each cache data;

a processing unit configured to carry out a processing for acquiring a cache data registered in correspondence to the first data name from the cache unit and transmitting an acquired cache data when the first data name is received from the another data transfer device, or a processing for registering the first data in correspondence to the first data name to be assigned to the first data into the cache unit and transmitting the first data when the first data is received from the another data transfer device; and a transmission unit configured to transmit the acquired cache data or the first data to the second communication device according to a processing carried out by the processing unit.

18. The data transfer device of claim 17, wherein the cache unit registers the cache data names each of which is a value obtained by compressing each cache data by a prescribed method, and the processing unit registers the first data name which is a value obtained by compressing the first data by the prescribed method.

19. The data transfer device of claim 17, wherein the cache unit registers the cache data names each of which is a value obtained by applying a prescribed hash function to each cache data, and the processing unit registers the first data name which is a value obtained by applying the prescribed hash function to the first data.

20. The data transfer device of claim 17, wherein the processing unit registers the first data in correspondence to the first data name into the cache unit when the first data name is received from the another data transfer device along with the first data.

21. The data transfer device of claim 17, wherein the processing unit transmits the acquired cache data or the first data name and registers the first data into the cache unit at least with respect to a data of a reply message which is not null.

22. The data transfer device of claim 17, wherein the processing unit excludes data that satisfy a prescribed condition from targets for carrying out a registration into the cache unit.

23. The data transfer device of claim 17, wherein the data transfer device is connected to the second communication device through a local area network.

24. The data transfer device of claim 17, wherein the data transfer device is provided in a form of a software implemented on the second communication device.

25. The data transfer device of claim 17, wherein when the processing unit registers the first data received from the another data transfer device into the cache unit and the first data is a data of a reply message corresponding to a request message from the second communication device to the first communication device, the processing unit also registers a URL for requested data of the request message corresponding to the reply message in correspondence to the first data name into the cache unit or another cache unit; and when the request message is received from the second communication device and the URL for the requested data of the request message is registered in the cache unit or the another cache unit, the processing unit also produces the reply message corresponding to the request message according to the requested data registered in the cache unit or the another cache unit in correspondence to the first data name corresponding to the URL, and transmits the reply message to the second communication device.

26. The data transfer device of claim 25, wherein the reception unit receives the request message of a GET method.

27. The data transfer device of claim 17, wherein the data transfer device is connected to the second communication device which is a client device, while the another data transfer device is connected to the first communication device which is a server device.

28. The data transfer device of claim 17, wherein at a time of transmitting the second data received from the second communication device to the another data transfer device, the processing unit also carries out a processing for registering the second data in correspondence to a second data name that is generated according to a content of the second data and assigned to the second data into the cache unit, when the second data name is not registered in the cache unit.

29. The data transfer device of claim 28, wherein when the second data is a data of a request message, the processing unit registers the second data into the cache unit upon receiving a reply message corresponding to the request message.

30. The data transfer device of claim 28, wherein when the second data is a data of a request message, the processing unit registers the second data into the cache unit before receiving a reply message corresponding to the request message.

31. The data transfer device of claim 28, wherein when the second data is formed by a plurality of unit data, the processing unit registers each one of all the unit data or a part of the unit data that satisfy a prescribed condition into the cache unit in correspondence to each unit data name that is generated according to a content of each unit data and assigned to each unit data.

32. The data transfer device of claim 31, wherein the second data is applied with a MIME encoding, and the processing unit obtains the unit data by decoding the MIME encoding.

33. A data transfer method at a data transfer device for receiving first data transmitted from a first communication device, transmitting the first data to another data transfer device connected to a second communication device that is a destination of the first data, receiving second data transmitted from the second communication device from the another data transfer device, and transmitting the second data to the first communication device that is a destination of the second data, the data transfer method comprising:

receiving the first data from the first communication device;

judging whether a first data name that is generated according to a content of the first data and assigned to the first data is registered in a cache unit configured to register cache data that were transmitted to the another data transfer device in past in correspondence to cache data names each of which is generated according to a content of each cache data and assigned to each cache data; and carrying out a processing for transmitting the first data name, instead of transmitting the first data, when the first data name is registered in the cache unit, or a processing for registering the first data in correspondence to the first data name into the cache unit and transmitting the first data when the first data name is not registered in the cache unit.

34. The data transfer method of claim 33, wherein when the processing for registering the first data received from the first communication device into the cache unit is to be carried out and the first data is a data of a reply message corresponding to a request message from the second communication device to the first communication device, the carrying out step also registers a URL for requested data of the request message corresponding to the reply message in correspondence to the first data name into the cache unit or another cache unit; and when the request message transmitted by the second communication device is received from the another data transfer device and the URL for the requested data of the request message is registered in the cache unit or the another cache unit, the carrying out step also produces the reply message corresponding to the request message and destined to the second communication device according to the requested data registered in the cache unit or the another cache unit in correspondence to the first data name corresponding to the URL, and transmits the reply message to the another data transfer device.

35. The data transfer method of claim 33, wherein at a time of transmitting the second data received from the another data transfer device to the first communication device, the carrying out step also carries out a processing for registering the second data in correspondence to a second data name that is generated according to a content of the second data and assigned to the second data into the cache unit, when the second data name is not registered in the cache unit.

36. A data transfer method at a data transfer device for receiving first data transmitted from a first communication device through another data transfer device, transmitting the first data to a second communication device that is a destination of the first data, receiving second data transmitted from the second communication device, and transmitting the second data to the another data transfer device connected to the first communication device that is a destination of the second data, the data transfer method comprising:

receiving the first data or a first data name that is generated according to a content of the first data and assigned to the first data, from the another data transfer device; and carrying out a processing for acquiring a cache data registered in correspondence to the first data name from a cache unit configured to register cache data that were received from the another data transfer device in past in correspondence to cache data names each of which is generated according to a content of each cache data and assigned to each cache data, and transmitting an acquired cache data when the first data name is received from the another data transfer device, or a processing for registering the first data in correspondence to the first data name to be assigned to the first data into the cache unit and transmitting the first data when the first data is received from the another data transfer device.

37. The data transfer device of claim 36, wherein when the processing for registering the first data received from the another data transfer device into the cache unit is to be carried out and the first data is a data of a reply message corresponding to a request message from the second communication device to the first communication device, the carrying out step also registers a URL for requested data of the request message corresponding to the reply message in correspondence to the first data name into the cache unit or another cache unit; and when the request message is received from the second communication device and the URL for the requested data of the request message is registered in the cache unit or the another cache unit, the carrying out step also produces the reply message corresponding to the request message according to the requested data registered in the cache unit or the another cache unit in correspondence to the first data name corresponding to the URL, and transmits the reply message to the second communication device.

38. The data transfer method of claim 36, wherein at a time of transmitting the second data received from the second communication device to the another data transfer device, the carrying out step also carries out a processing for registering the second data in correspondence to a second data name that is generated according to a content of the second data and assigned to the second data into the cache unit, when the second data name is not registered in the cache unit.

39. A computer program product for causing a computer to function as a data transfer device for receiving first data transmitted from a first communication device, transmitting the first data to another data transfer device connected to a second communication device that is a destination of the first data, receiving second data transmitted from the second communication device from the another data transfer device, and transmitting the second data to the first communication device that is a destination of the second data, the computer program product comprising:

a first computer program code for causing the computer to receive the first data from the first communication device;

second computer program code for causing the computer to judge whether a first data name that is generated according to a content of the first data and assigned to the first data is registered in a cache unit configured to register cache data that were transmitted to the another data transfer device in past in correspondence to cache data names each of which is generated according to a content of each cache data and assigned to each cache data; and a third computer program code for causing the computer to carry out a processing for transmitting the first data name, instead of transmitting the first data, when the first data name is registered in the cache unit, or a processing for registering the first data in correspondence to the first data name into the cache unit and transmitting the first data when the first data name is not registered in the cache unit.

40. The computer program product of claim 39, wherein when the processing for registering the first data received from the first communication device into the cache unit is to be carried out and the first data is a data of a reply message corresponding to a request message from the second communication device to the first communication device, the third computer program code also registers a URL for requested data of the request message corresponding to the reply message in correspondence to the first data name into the cache unit or another cache unit; and when the request message transmitted by the second communication device is received from the another data transfer device and the URL for the requested data of the request message is registered in the cache unit or the another cache unit, the third computer program code also produces the reply message corresponding to the request message and destined to the second communication device according to the requested data registered in the cache unit or the another cache unit in correspondence to the first data name corresponding to the URL, and transmits the reply message to the another data transfer device.

41. The computer program product of claim 39, wherein at a time of transmitting the second data received from the another data transfer device to the first communication device, the third computer program code also carries out a processing for registering the second data in correspondence to a second data name that is generated according to a content of the second data and assigned to the second data into the cache unit, when the second data name is not registered in the cache unit.

42. A computer program product for causing a computer to function as a data transfer device for receiving first data transmitted from a first communication device through another data transfer device, transmitting the first data to a second communication device that is a destination of the first data, receiving second data transmitted from the second communication device, and transmitting the second data to the another data transfer device connected to the first communication device that is a destination of the second data, the computer program product comprising:

a first computer program code for causing the computer to receive the first data or a first data name that is generated according to a content of the first data and assigned to the first data, from the another data transfer device; and a second computer program code for causing the computer to carry out a processing for acquiring a cache data registered in correspondence to the first data name from a cache unit configured to register cache data that were received from the another data transfer device in past in correspondence to cache data names each of which is generated according to a content of each cache data and assigned to each cache data, and transmitting an acquired cache data when the first data name is received from the another data transfer device, or a processing for registering the first data in correspondence to the first data name to be assigned to the first data into the cache unit and transmitting the first data when the first data is received from the another data transfer device.

43. The computer program product of claim 42, wherein when the processing for registering the first data received from the another data transfer device into the cache unit is to be carried out and the first data is a data of a reply message corresponding to a request message from the second communication device to the first communication device, the second computer program code also registers a URL for requested data of the request message corresponding to the reply message in correspondence to the first data name into the cache unit or another cache unit; and when the request message is received from the second communication device and the URL for the requested data of the request message is registered in the cache unit or the another cache unit, the second computer program code also produces the reply message corresponding to the request message according to the requested data registered in the cache unit or the another cache unit in correspondence to the first data name corresponding to the URL, and transmits the reply message to the second communication device.

44. The computer program product of claim 42, wherein at a time of transmitting the second data received from the second communication device to the another data transfer device, the second computer program code also carries out a processing for registering the second data in correspondence to a second data name that is generated according to a content of the second data and assigned to the second data into the cache unit, when the second data name is not registered in the cache unit.

* * * * *